United States Patent
Wiacek

(10) Patent No.: US 12,379,450 B2
(45) Date of Patent: Aug. 5, 2025

(54) DEVICE POSITIONING

(71) Applicant: Nokia Technologies Oy, Espoo (FI)

(72) Inventor: Fabian Wiacek, Warsaw (PL)

(73) Assignee: Nokia Technologies Oy, Espoo (FI)

( * ) Notice: Subject to any disclaimer, the term of this patent is extended or adjusted under 35 U.S.C. 154(b) by 268 days.

(21) Appl. No.: 18/245,029

(22) PCT Filed: Aug. 18, 2021

(86) PCT No.: PCT/FI2021/050553
§ 371 (c)(1),
(2) Date: Mar. 13, 2023

(87) PCT Pub. No.: WO2022/058644
PCT Pub. Date: Mar. 24, 2022

(65) Prior Publication Data
US 2023/0400548 A1 Dec. 14, 2023

(30) Foreign Application Priority Data
Sep. 15, 2020 (FI) .................................. 20205887

(51) Int. Cl.
*G01S 5/02* (2010.01)
*G01S 5/10* (2006.01)

(52) U.S. Cl.
CPC .............. *G01S 5/0244* (2020.05); *G01S 5/10* (2013.01)

(58) Field of Classification Search
CPC ................................. G01S 5/0244; G01S 5/10
USPC ........................................................ 342/451
See application file for complete search history.

(56) References Cited

U.S. PATENT DOCUMENTS

| | | |
|---|---|---|
| 6,154,657 A | 11/2000 | Grubeck et al. |
| 6,282,427 B1 | 8/2001 | Larsson et al. |
| 6,408,246 B1 | 6/2002 | Fox |
| 8,971,921 B2 | 3/2015 | Chen et al. |
| 2008/0299992 A1 | 12/2008 | Eitan et al. |
| 2010/0056177 A1 | 3/2010 | Kojima |
| 2012/0008831 A1 | 1/2012 | Tanigawa |
| 2017/0280280 A1 | 9/2017 | Jain et al. |
| 2018/0313929 A1 | 11/2018 | Bitra et al. |

(Continued)

FOREIGN PATENT DOCUMENTS

| | | | |
|---|---|---|---|
| CN | 1185267 A | 6/1998 | |
| CN | 104350783 B | * 4/2016 | ............ H04W 24/04 |

(Continued)

OTHER PUBLICATIONS

Fischer, "Observed Time Difference of Arrival (OTDOA) Positioning in 3GPP LTE", Qualcomm Technologies Inc, Jun. 6, 2014, pp. 1-62.

(Continued)

*Primary Examiner* — Harry K Liu
(74) *Attorney, Agent, or Firm* — Nokia Technologies Oy

(57) ABSTRACT

An apparatus, method and computer program is described comprising: determining a first position estimate for a device based, at least in part, on time delay data from a first serving cell to the device and second data relating to at least one second cell; and selecting, based on the first position estimate for the device, a first constellation of base stations, from a plurality of candidate constellations of base stations, for use in determining a second position estimate for the device.

15 Claims, 18 Drawing Sheets

(56) References Cited

U.S. PATENT DOCUMENTS

| | | | |
|---|---|---|---|
| 2019/0053013 A1 | 2/2019 | Markhovsky et al. | |
| 2019/0327673 A1 | 10/2019 | Bitra et al. | |
| 2022/0095256 A1* | 3/2022 | Lee | G01S 5/0072 |

FOREIGN PATENT DOCUMENTS

| | | | | |
|---|---|---|---|---|
| CN | 113412654 B | * | 10/2024 | G01S 13/765 |
| EP | 2713179 A1 | | 4/2014 | |
| WO | 96/31076 A1 | | 10/1996 | |
| WO | 02/33435 A2 | | 4/2002 | |
| WO | WO-2008016246 A1 | * | 2/2008 | G01S 5/10 |
| WO | 2018/202070 A1 | | 11/2018 | |
| WO | 2020/001821 A1 | | 1/2020 | |

OTHER PUBLICATIONS

Office action received for corresponding Finnish Patent Application No. 20205887, dated Dec. 18, 2020, 6 pages.

International Search Report and Written Opinion received for corresponding Patent Cooperation Treaty Application No. PCT/FI2021/050553, dated Nov. 18, 2021, 18 pages.

"Enhanced Positioning—Positioning performance evaluation", 3GPP TSG RAN6#2, R6-160235, Agenda item 7.1.1, Ericsson LM, Nov. 14-18, 2016, pp. 1-12.

Extended European Search Report received for corresponding European Patent Application No. 21868789.5, dated Sep. 27, 2024, 11 pages.

Office action received for corresponding Chinese Patent Application No. 202180075913.8, dated Apr. 30, 2025, 12 pages of office action and 8 pages of summary & translation available.

* cited by examiner

DEVICE POSITIONING

RELATED APPLICATION

This application was originally filed as PCT Application No. PCT/FI2021/050553, filed on Aug. 18, 2021, which claims priority to FI application No. 20205887, filed on Sep. 15, 2020, each of which is incorporated herein by reference in its entirety.

FIELD

This present specification relates to device positioning.

BACKGROUND

Although arrangements for estimating the position of a device, such as a user device, based on signals transmitted within a mobile communication system are known, there remains room for further developments in this field.

SUMMARY

In a first aspect, this specification describes an apparatus comprising means for performing: determining a first position estimate for a device (e.g. a user device or an electronic device) based, at least in part, on time delay data (e.g. time of arrival or timing advance data) from a first serving cell to the device and second data relating to at least one second cell; and selecting, based on the first position estimate for the device, a first constellation of base stations, from a plurality of candidate constellations of base stations, for use in determining a second position estimate for the device. The second position estimate may (generally) be more accurate than the first position estimate.

The first constellation of base stations may be selected such that said first position estimate is within an area defined by the first constellation.

Some example embodiments further comprise means for performing: determining a distance of the first position estimate from a centre of each of at least some of said candidate constellations, wherein said first constellation of base stations is selected based, at least in part, on said determined distances. For example, the first constellation may be selected based on the candidate constellation having the smallest distance.

The second data may include time delay data from the at least one second cell and the device and/or signal strength data relating to the at least one second cell and the device.

The means for performing selecting the first constellation of base stations may select said constellation based, at least in part, on relative sizes of said candidate constellations. For example, larger constellations may be preferred in some example embodiments. Alternative configurations are possible, for example constellations within a defined range of sizes may be preferred.

The means for performing selecting the first constellation of base stations may select said constellation based, at least in part, on minimising a measure of geometric dilution of precision (GDP) with minimal required number of measurements.

The first serving cell may be a current serving cell for the device. At least one of the at least one second cell may be a previous cell (e.g. a previous serving cell) for the device. The at least one second cell may provide historical position data.

The first position estimate for a device may be based, at least in part, on angle of arrival data and/or beamforming data for one or more transmissions from the first serving cell to the device and/or one or more transmissions from at least one of the second serving cells to the device.

Some example embodiments further comprise means for performing: determining a first arc of possible positions for the device based on the first time delay data and the location of the first serving cell; and determining one or more second arcs of possible positions for the device based on the second data and the location of the respective second cell, wherein determining the first position estimate comprises determining an intersection between the first and second arcs.

The selected constellation of base stations may comprise three or more base stations.

Some example embodiments further comprise means for performing: determining said second position estimate using said constellation of base stations.

Some example embodiments further comprise means for performing: generating neighbour cell information includes at least said first constellation of base stations, wherein said neighbour cell information comprises an ordered list of base stations including at least said first constellation of base stations. The ordered list of base stations may, for example, be ordered in decreasing of geometric dilution of precision.

The said means may comprise: at least one processor; and at least one memory including computer program code, the at least one memory and the computer program configured, with the at least one processor, to cause the performance of the apparatus.

In a second aspect, this specification describes a method comprising: determining a first position estimate for a device (e.g. a user device or an electronic device) based, at least in part, on time delay data from a first serving cell to the device and second data relating to at least one second cell; and selecting, based on the first position estimate for the device, a first constellation of base stations, from a plurality of candidate constellations of base stations, for use in determining a second position estimate for the device. The method may further comprises determining said second position estimate using said first constellation of base stations.

The first constellation of base stations may be selected such that said first position estimate is within an area defined by the first constellation.

The method may further comprise: determining a distance of the first position estimate from a centre of each of at least some of said candidate constellations, wherein said first constellation of base stations is selected based, at least in part, on said determined distances. For example, the first constellation may be selected based on the candidate constellation having the smallest distance.

The second data may include time delay data from the at least one second cell and the device and/or signal strength data relating to the at least one second cell and the device.

The first constellation of base stations may be selected based, at least in part, on relative sizes of said candidate constellations. For example, larger constellations may be preferred in some example embodiments. Alternative configurations are possible, for example constellations within a defined range of sizes may be preferred.

The first constellation of base stations may be selected based, at least in part, on minimising a measure of geometric dilution of precision (GDP) with minimal required number of measurements.

The first serving cell may be a current serving cell for the device. At least one of the at least one second cell may be a previous cell (e.g. a previous serving cell) for the device. The at least one second cell may provide historical position data.

The first position estimate for a device may be based, at least in part, on angle of arrival data and/or beamforming data for one or more transmissions from the first serving cell to the device and/or one or more transmissions from at least one of the second serving cells to the device.

The method may further comprise: determining a first arc of possible positions for the device based on the first time delay data and the location of the first serving cell; and determining one or more second arcs of possible positions for the device based on the second data and the location of the respective second cell, wherein determining the first position estimate comprises determining an intersection between the first and second arcs.

The selected constellation of base stations may comprise three or more base stations.

The method may further comprise: generating neighbour cell information includes at least said first constellation of base stations, wherein said neighbour cell information comprises an ordered list of base stations including at least said first constellation of base stations. The ordered list of base stations may, for example, be ordered in decreasing of geometric dilution of precision.

In a third aspect, this specification describes computer-readable instructions which, when executed by computing apparatus, cause the computing apparatus to perform (at least) any method as described with reference to the second aspect.

In a fourth aspect, this specification describes a computer-readable medium (such as a non-transitory computer-readable medium) comprising program instructions stored thereon for performing (at least) any method as described with reference to the second aspect.

In a fifth aspect, this specification describes an apparatus comprising: at least one processor; and at least one memory including computer program code which, when executed by the at least one processor, causes the apparatus to perform (at least) any method as described with reference to the second aspect.

In a sixth aspect, this specification describes a computer program comprising instructions for causing an apparatus to perform at least the following: determining a first position estimate for a device (e.g. a user device or an electronic device) based, at least in part, on time delay data from a first serving cell to the device and second data relating to at least one second cell; and selecting, based on the first position estimate for the device, a first constellation of base stations, from a plurality of candidate constellations of base stations, for use in determining a second position estimate for the device.

In a seventh aspect, this specification describes an apparatus comprising means (such as serving mobile location center (SMLC)) for determining a first position estimate for a device (e.g. a user device or an electronic device) based, at least in part, on time delay data from a first serving cell to the device and second data relating to at least one second cell; and means (such as a processor or a control module) for selecting, based on the first position estimate for the device, a first constellation of base stations, from a plurality of candidate constellations of base stations, for use in determining a second position estimate for the device.

BRIEF DESCRIPTION OF THE DRAWINGS

Example embodiments will now be described, by way of example only, with reference to the following schematic drawings, in which.

DETAILED DESCRIPTION

Figure 1:
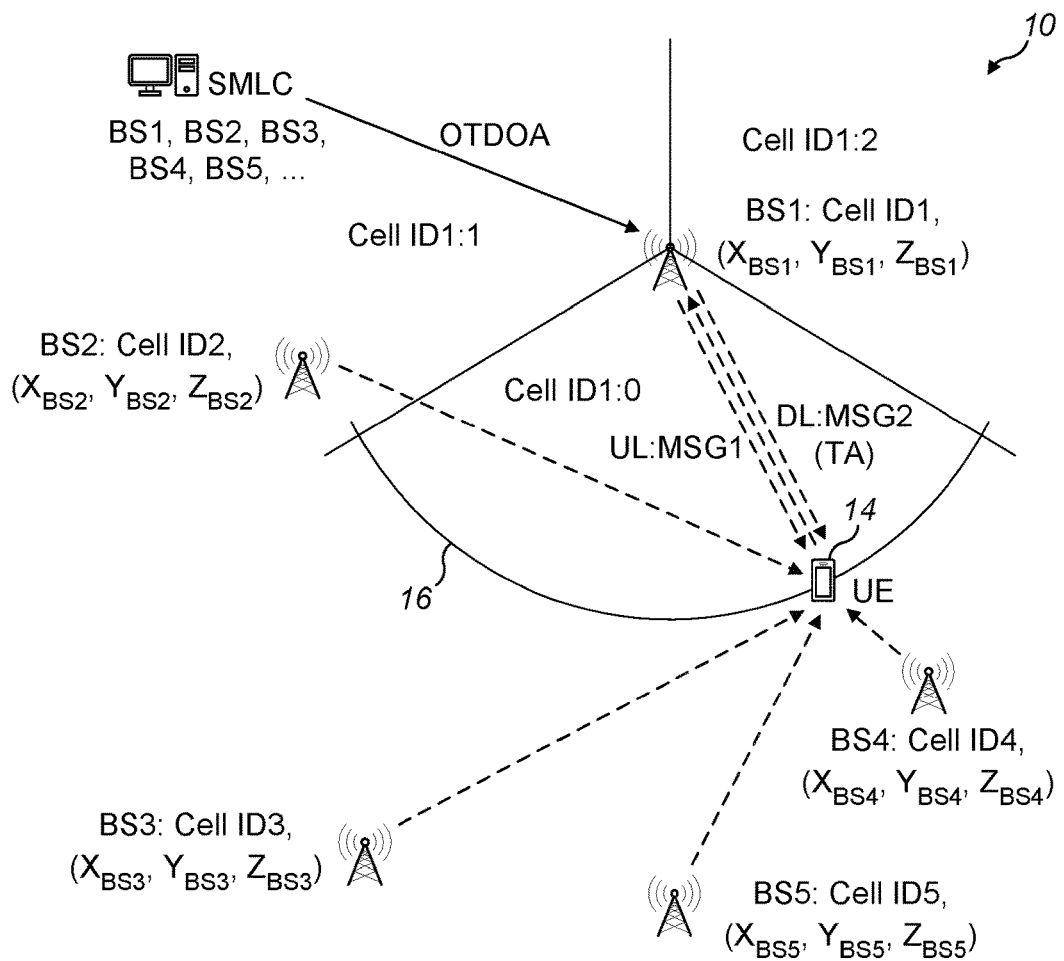
FIG. 1 is a block diagram of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in accordance with an example embodiment. The system 10 comprises a server (e.g. a serving mobile location center (SMLC)) and a device 14 (e.g. a user device, a mobile communication device, user equipment, or mobile phone).

The system 10 further comprises a first base station (BS1), a second base station (BS2), a third base station (BS3), a fourth base station (BS4) and a fifth base station (BS5) that are each in communication with the device 14. The first base station BS1 is the current serving cell for a device for which a position estimate is desired.

On the basis of first time delay data (e.g. an Observed Time Difference Of Arrival (OTDOA) measurement), the distance between the device 14 and the first base station BS1 can be determined. A first arc 16 of possible positions for the device based on the first time delay data and the location of the first serving cell.

Figure 2:
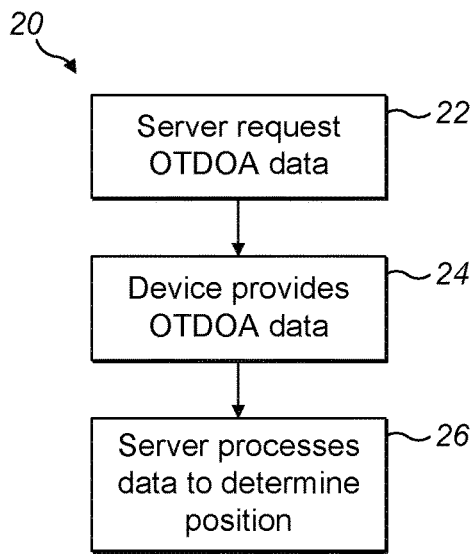
FIGS. 2 and 3 are flow charts showing algorithms in accordance with an example embodiments.

FIG. 2 is a flow chart showing an algorithm, indicated generally by the reference numeral 20, in accordance with an example embodiment.

The algorithm 20 starts at operation 22, where the server 12 sends a request to the device 14 for OTDOA data. The request includes OTDOA Neighbour Cell Info, which is a list of cells sorted in decreasing order of priority for measurement.

At operation 24, the device obtains OTDOA data from the serving base station BS1 for the device 14 and from a plurality of other base stations (such as at least the base stations BS2, BS3, BS4 and BS5) and provides those data to the server 12. The device 14 obtains the data from the cells indicated in the OTDOA Neighbour Cell Info provided in the operation 22. In some example embodiments, this list may contain up to 72 neighbour cells, which can place a significant burden on the device and can introduce significant delay.

Finally, at operation 26, the device processes the OTDOA data in order to determine a location of the device. Using data from up to 72 neighbour cells, as specified in the OTDOA Neighbour Cell Info may result in an accurate determination of the device position, but may be computationally intensive.

Thus, the algorithm 20 requires the SMLC positioning logic to request OTDOA data from many neighbour cells. The requested OTDOA data is then obtained by the device 14 and transmitted to the server 12. Such OTDOA positioning uses significant radio resources for signaling and uses significant number of processing time, which may have significant impact on device performance. It also means that this method of positioning may be relatively long.

Figure 3:
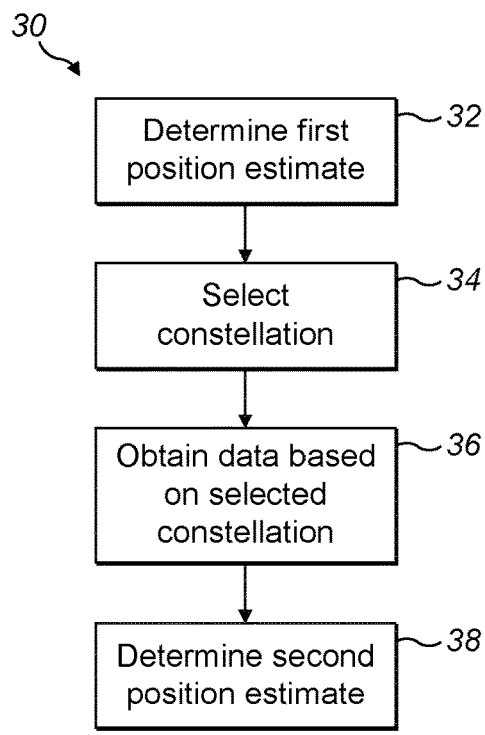

FIG. 3 is a flow chart showing an algorithm, indicated generally by the reference numeral 30, in accordance with an example embodiment.

Figure 4:
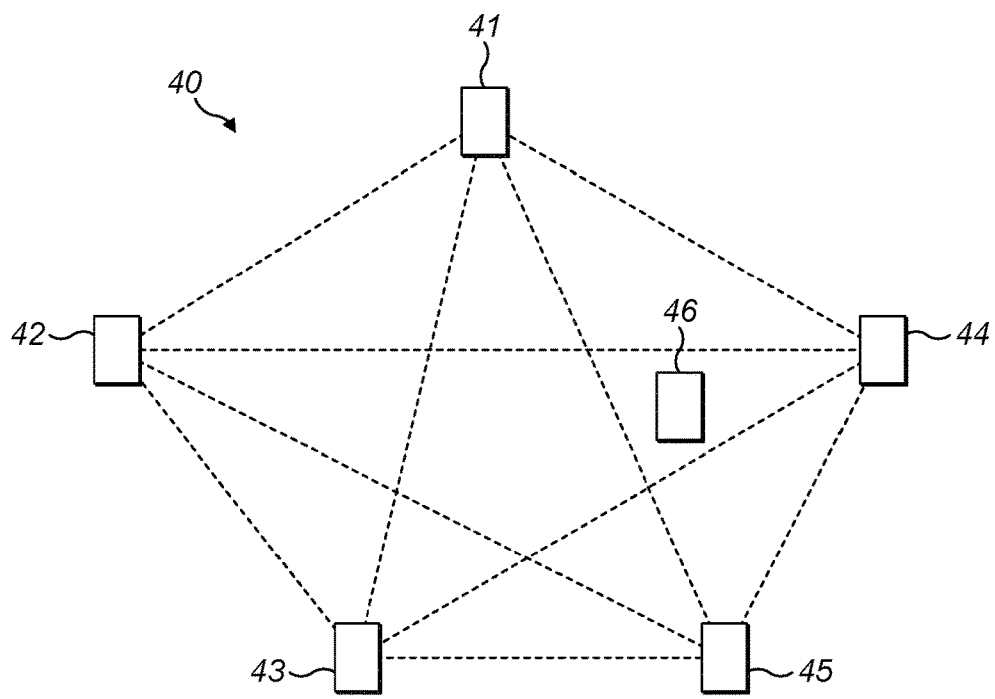
FIGS. 4 to 7 are block diagrams of systems in accordance with example embodiments.

FIG. 4 is a block diagram, of a system, indicated generally by the reference numeral 40, in accordance with an example embodiment. The system 40 may implement the algorithm 30.

The system 40 comprises a first base station 41, a second base station 42, a third base station 43, a fourth base station 44 and a fifth base station 45 similar to the base stations BS1 to BS5 of the system 10 described above. A device 46 (similar to the device 14) is located within the system 40.

The algorithm 30 starts at operation 32, where a first position estimate for a device (such as the device 46 or some other electronic device) is determined. As discussed further below, the first position estimate may be based, at least in part, on time delay data from a first serving cell to the device and second data relating to at least one second cell.

At operation 34, a first constellation of base stations is selected from a plurality of candidate constellations of base stations. The first constellation of base station is selected based on the first position estimate determined in the operation 32 (e.g. a first estimated position of device 46). For example, the first constellation of base stations may be selected such that said first position estimate is within an area defined by the first constellation, as discussed further below.

The system 40 includes a number of candidate constellations, each having three base stations (although constellations may have more than three base stations, as discussed elsewhere herein). Thus, the candidate 3-base station constellations are:

Base stations 41, 42 and 43
Base stations 41, 42 and 44
Base stations 41, 42 and 45
Base stations 41, 43 and 44
Base stations 41, 43 and 45
Base stations 41, 44 and 45
Base stations 42, 43 and 44
Base stations 42, 43 and 45
Base stations 42, 44 and 45
Base stations 43, 44 and 45

At operation 36, data is obtained based on the first constellation selected in the operation 34. The data may, for example, be time delay data relating to signal delays between the device 46 and a plurality of base stations in accordance with the first constellation of base stations.

At operation 38, a second position estimate for the device is determined using the data obtained in the operation 36. As discussed in detail below, an appropriate selection of the first constellation of base stations (in the operation 34) may result in the second position estimate being an accurate position estimate, without requiring a large number of base stations to be used in the generation of that position estimate.

Figure 5:
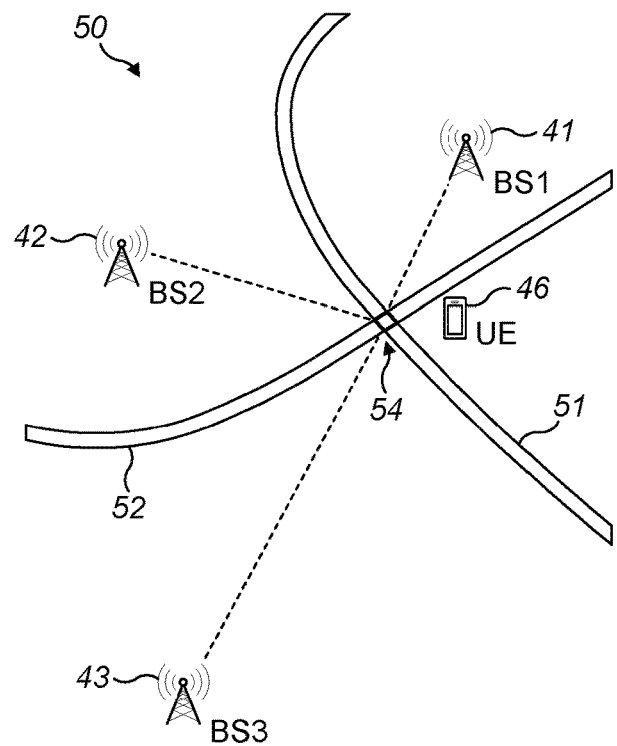

FIG. 5 is a block diagram, of a system, indicated generally by the reference numeral 50, in accordance with an example embodiment. The system 50 comprises the device 46 described above and further comprises a first constellation of base stations comprising the first base station 41, the second base station 42 and the third base station 43 described above.

In OTDOA based positioning, in which device 46 position is within the first base station 41, the second base station 42 and the third base station 43 constellation, the position of the device 46 is determined by an intersection area of OTDOA hyperboloids 51 and 52, which is characterised by Geometric Dilution of Precision (GDP) error. GDP error depends on hyperboloids 51 and 52 intersection angle and is minimal when hyperboloids intersect at right angles, which corresponds to the centre of constellation.

Figure 6:
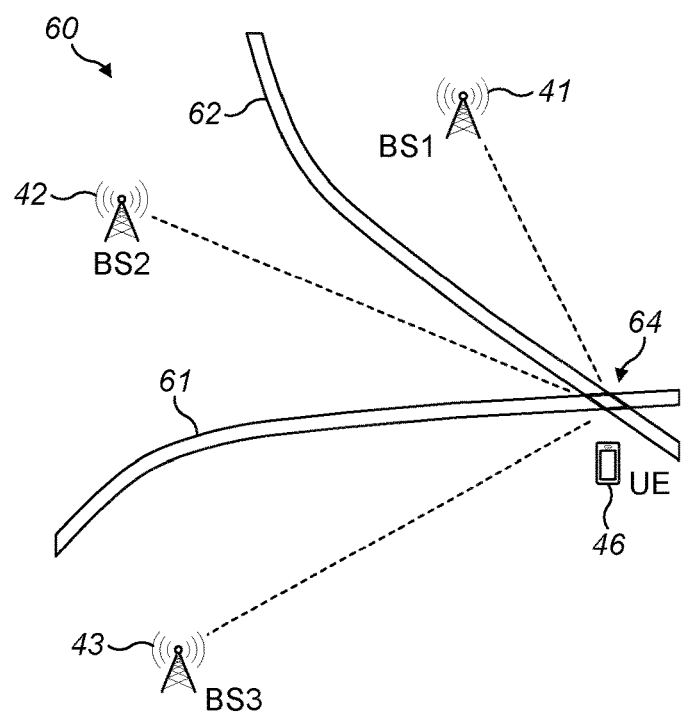

FIG. 6 is a block diagram, of a system, indicated generally by the reference numeral 60, in accordance with an example embodiment. The system 60 is identical to the system 50, with the exception that device 46 is in a different position relative to the base stations 41 to 43.

In OTDOA based positioning in which the device 46 position is outside the first base station 41, the second base station 42 and the third base station 43 constellation (e.g. outside a triangle having corners formed by the positions of those base stations), the position of the device 46 is determined by intersection area of OTDOA hyperboloids 61 and 62, which is also characterised by GDP error. If device 46 is outside the constellation, the hyperboloids intersect at acute angles and in this case hyperboloids area has larger size, which means higher GDP error.

The hyperboloids intersection 54 is smaller than the hyperboloids intersection 64, indicating that the GDP is smaller, and hence the position accuracy greater. In general, an optimum GDP may be obtained if the device is within a constellation defined by the base stations from which time delay signals are obtained. Thus, as noted above, the accuracy of the second position estimate generated in the operation 38 is dependent on the selection of the constellation in the operation 34. The impact is characterized by Geometric Dilution of Precision (GDP), as discussed further below.

The second position estimate determined in the operation 38 may obtain OTDOA data from as few as three base stations, as shown in the systems 50 and 60. This can provide sufficiently accurate positioning in many circumstances, provided that a suitable constellation is selected in the operation 34.

As shown in the system 50, relatively good positioning accuracy (minimal GDP) may be achieved with a small number of base stations (for 3D or 2D positioning accordingly), if the device is inside the constellation of base stations. In such circumstances, additional OTDOA measurements may not significantly improve device position accuracy, as GDP intersection area may be only rounded to form circle-like intersection area. Thus, positioning with a help of minimum three base stations may be more effective with respect to seventy-two base stations, when considering total costs (required radio resources, required number of measurements, required processing time) to benefits in terms of better accuracy (minimal GDP), which means rounded intersection area.

Moreover, as can be seen in the system 60, if the device is outside the relevant constellation, then even a using a significant number of base stations (such as seventy-two) may not significant improve the GDP area (and hence positioning accuracy), since the GDP will still have diamond-like shape.

Figure 7:
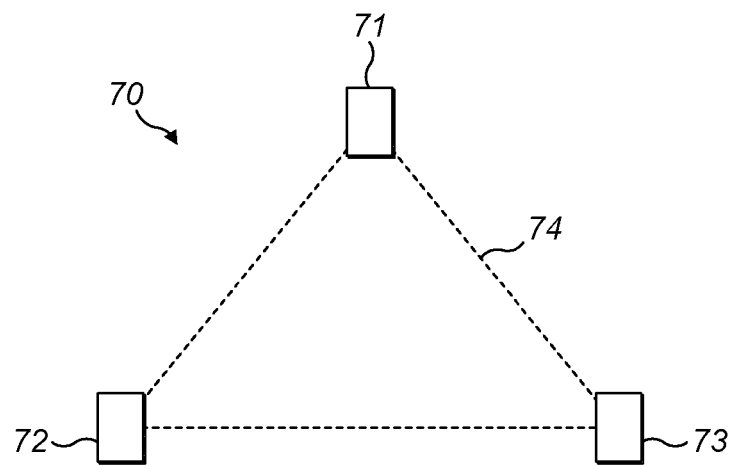

FIG. 7 is a block diagram of a system, indicated generally by the reference numeral 70, in accordance with an example embodiment. The system 70 comprises a first base station 71, a second base station 72 and a third base station 73 that collectively form a constellation. The constellation may define a triangle 74 that joins each of the base stations. OTDOA positioning may be accurate in the event that the device being located is within the triangle 74. Moreover, as discussed further below, OTDOA positioning may be most accurate in the event that the device is located at the geometric centre of the triangle 74.

Figure 8:
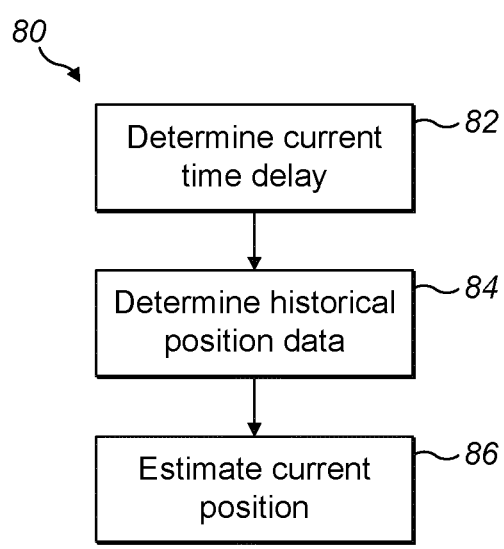
FIGS. 8 and 9 are flow charts showing algorithms in accordance with an example embodiments.

FIG. 8 is a flow chart showing an algorithm, indicated generally by the reference numeral 80, in accordance with an example embodiment. The algorithm 80 may be used to implement the operation 32 of the algorithm 30 described above.

The algorithm 80 starts at operation 82, where time delay data (e.g. Timing Advance data) from a first serving cell (such as the first base station 41) to a device (such as the device 46) is obtained. As discussed elsewhere herein, time delay data can be used to determine a position (or a position arc) of the device.

At operation 84, historical position data for the user is determined. For example, data from a second cell (e.g. a previous serving cell for the device) may be obtained. As discussed below, that data may be time delay data, but that is not essential to all example embodiments.

At operation 86, a first position estimate for the device is determined based on a combination of the position estimates obtained in the operation 82 and 84.

Figure 9:
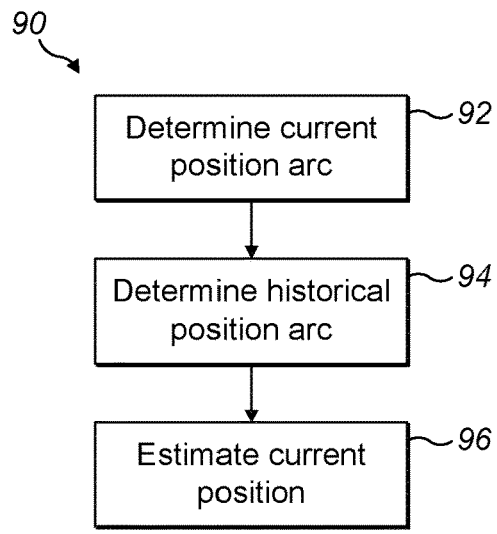

FIG. 9 is a flow chart showing an algorithm, indicated generally by the reference numeral 90, in accordance with an example embodiment. The algorithm 90 may be used to implement the operation 32 of the algorithm 30 described above and similar to the algorithm 80 described above.

The algorithm 90 starts at operation 92, where position arc of the device at the current time is determined.

At operation 94, a position arc of the device at a previous time instance (historical position data) is determined. The historical position data may be obtained from a previous serving cell for the device (different to the current serving cell).

At operation 96, a first position estimate for the device is determined based on a combination of the position estimates obtained in the operation 92 and 94 (e.g. an intersection of the respective position arcs).

Figure 10:
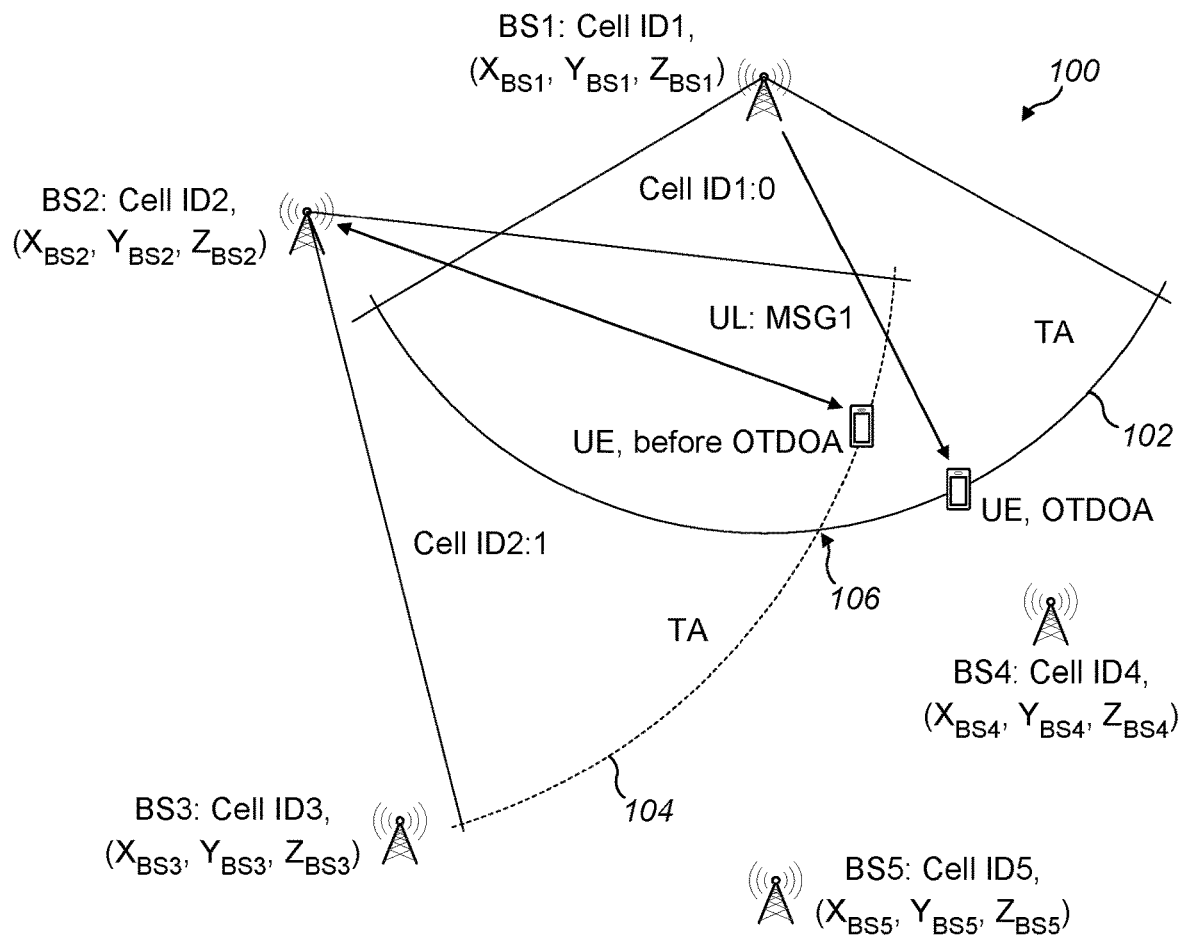
FIG. 10 is a block diagram of a system in accordance with an example embodiment.

FIG. 10 is a block diagram of a system, indicated generally by the reference numeral 100, in accordance with an example embodiment. The system 100 may be used in an implementation of the algorithm 90.

The system 100 comprising a first base station (BS1), a second base station (BS2), a third base station (BS3), a fourth base station (BS4) and a fifth base station (BS5) that are similar to the base stations 41 to 45 described above with reference to the system 40. The first base station BS1 is the current serving cell for a device (UE) for which a position estimate is desired.

On the basis of first time delay data (e.g. Timing Advance index value), the distance between the device (UE) and the first base station BS1 can be determined (thereby implementing operation 92 of the algorithm 90). A first arc 102 of possible positions for the device based on the first time delay data and the location of the first serving cell.

The second base station BS2 is a previous serving cell for the device. On the basis of a second time delay signal (e.g. Timing Advance index value made when the second base station BS2 was the serving cell), a distance between the device and the second base station at that time can be determined (thereby implementing operation 94 of the algorithm 90). A second arc 104 of possible positions for the second device can be determined based on the second time delay signal and the location of the respective second base station.

The intersection of the first arc 102 and the second arc 104 is indicated by the reference numeral 106. That position may be used as the first position estimate for the device, thereby implementing the operation 96 of the algorithm 90 (and completing the operation 32 of the algorithm 30).

As noted above, time delay measurements are not the only measurements used in example embodiments.

Figure 11:
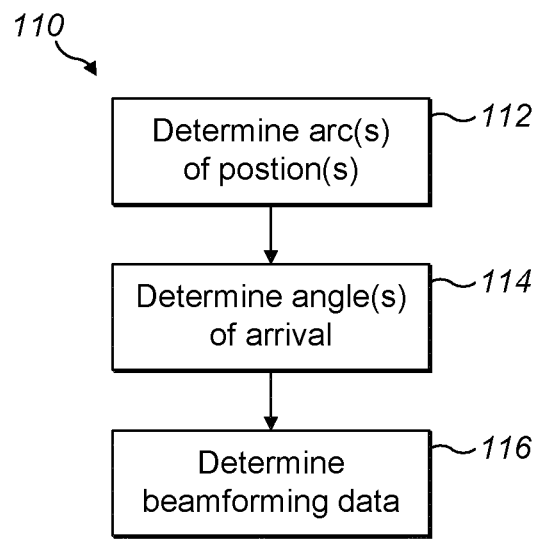
FIG. 11 is a flow chart showing an algorithm in accordance with an example embodiment.

FIG. 11 is a flow chart showing an algorithm, indicated generally by the reference numeral 110, in accordance with an example embodiment. The algorithm 110 shows a number of options that may be used in determining a position of a device.

The algorithm 110 starts at operation 112, where one or more arcs of positions (such as the arcs 102 and/or 104 described above) may be determined. The arcs are determined based on time delay measurements and known positions of base stations.

At operation 114, an angle of arrival of a signal may be determined. For example, a base station may determine an angle of arrival of a signal from a device, which angle of arrival may be used as part of a positioning algorithm.

At operation 116, beamforming data may be determined. The beamforming data may, for example, be generated at a base station indicating dimensions of a signal beam, which dimensions may be used as part of a positioning algorithm.

One or more of the operations of the algorithm 110 may be omitted. Furthermore, one or more other operations may be provided. Thus, a range of positioning data may be used. By way of example, the first position estimate for a device discussed above may be based, at least in part, on angle of arrival data and/or beamforming data for one or more transmissions from a first serving cell to the device and/or one or more transmissions from at least one of a second cell (e.g. a previous serving cell) to the device.

Figure 12:
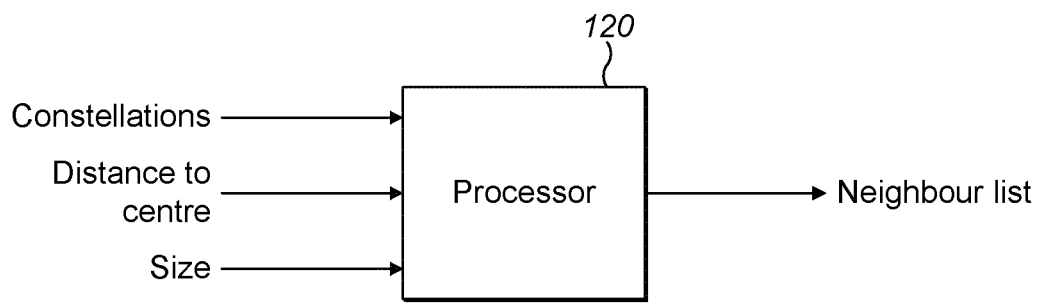
FIG. 12 shows a processor used in an example embodiment.

FIG. 12 shows a processor 120 used in an example embodiment. The processor 120 may be used to implement the operation 34 of the algorithm 30 described above.

The processor 110 receives at least some of: constellation data, distance to centre data and size data. The constellation data indicates the candidate constellations within which the first position estimated in the operations 32 and 96 occur. For example, the device 46 shown in the system 40 falls within constellations formed by the base stations 41, 44 and 45, the base stations 41, 43 and 44, the base stations 42, 43 and 44, and the base stations 42, 44 and 45. The constellations identified in the input may be candidate constellations, one of which may be selected in the operation 34 of the algorithm 30.

The "distance to centre" input provides optional data indicating, for each candidate constellation, a distance between the first position and the centre (e.g. a geometric centre) of the constellation. In some example embodiments, the candidate constellation with the shortest distance is selected, by the processor 110, in the operation 34.

The "size" input provides optional data indicating, for each candidate constellation, a size of the constellation. The relative sizes of candidate constellations may be used by the processor 110 in the selection of the constellation in the operation 34 (for example, by selecting constellations having larger sizes, although this is not essential to all example embodiments). The size of the constellation may be determined in a number of ways, such as by determining an area encompassed by shape (e.g. a triangle) having corners at the locations of the base stations of the constellation.

Figure 13:
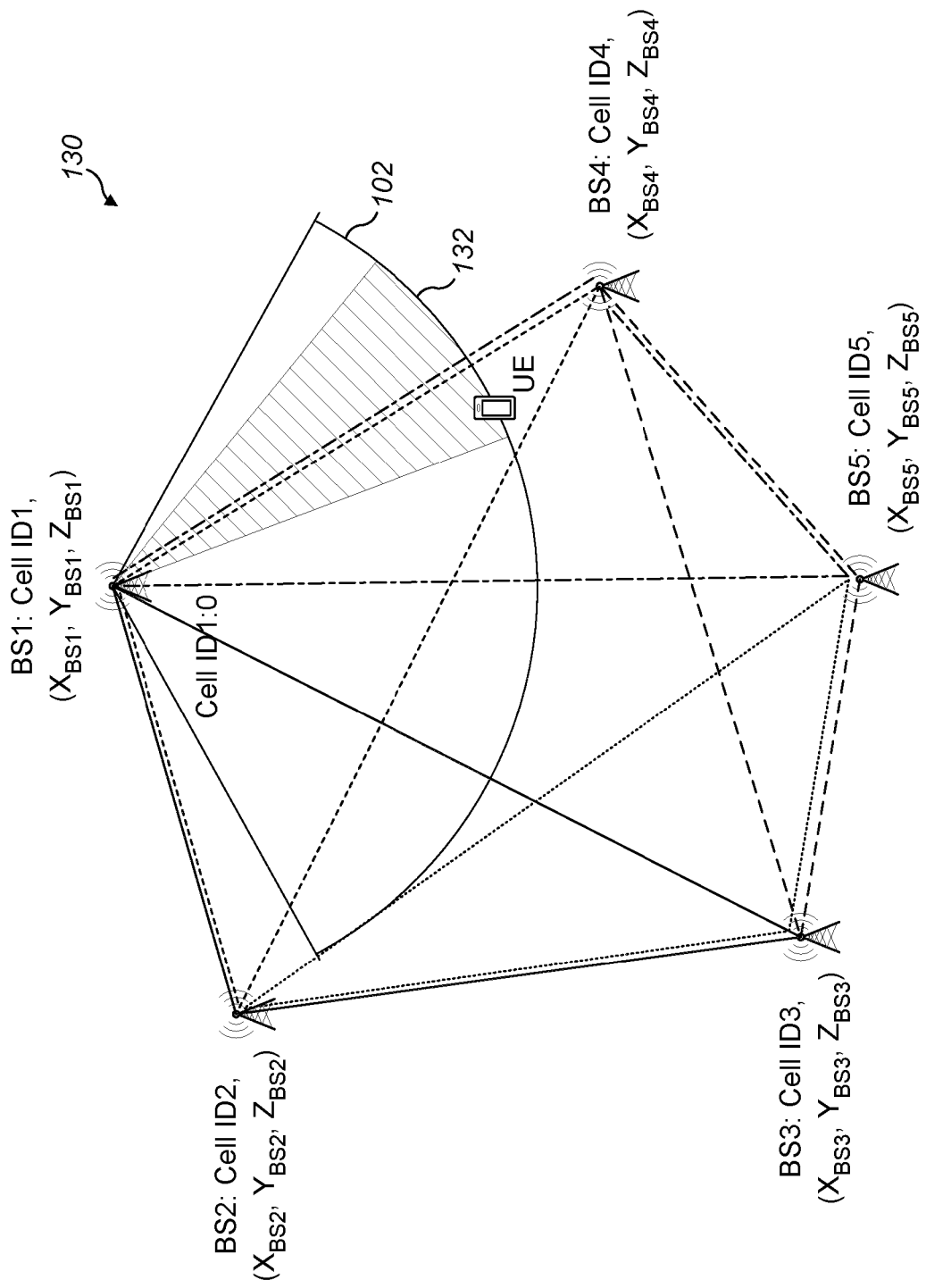
FIGS. 13 and 14 are block diagrams of systems in accordance with example embodiments.

FIG. 13 is a block diagram of a system, indicated generally by the reference numeral 130, in accordance with an example embodiment. The system 130 comprises the first base station (BS1), the second base station (BS2), the third base station (BS3), the fourth base station (BS4) and the fifth base station (BS5) of the system 100 described above. The first base station BS1 is the current serving cell for a device for which a position estimate is desired. As described above, a first arc 102 of possible positions for the device can be determined based on the first time delay data and the location of the first serving cell.

As described in detail below, a method has been developed in which a prioritized list of neighbouring reference sites (base stations) that can be used for OTDOA measurements can be generated, for example to minimize GDP. In this way, the number of neighbour cells needed for accurate positioning may be reduced whilst maintaining high UE positioning accuracy.

The system 130 includes a plurality of candidate constellations of three base stations, within which the device may be located. Note that the use of groups of three base stations within a constellation is the minimum required for multilateration positioning, but is not essential to all example embodiments. For example, four or more base stations could be included within a single constellation.

It should also be noted that the use of OTDOA is one example of multilateration-based positioning, which uses hyperboloids for position determination. The principles described herein are applicable to other multilateration-based techniques.

The system 130 includes the following candidate constellations of base stations (or reference sites):

BS1-BS2-BS3
BS1-BS2-BS4
BS1-BS2-BS5
BS1-BS3-BS4
BS1-BS3-BS5
BS1-BS4-BS5
BS2-BS3-BS4
BS2-BS3-BS5
BS2-BS4-BS5
BS3-BS4-BS5

The arc 102 pass through all of the candidate constellations listed above, with the exception of BS2-BS3-BS5 and BS3-BS4-BS5.

The zone 132 passes through candidate constellations BS1-BS2-BS4, BS1-BS3-BS4, and BS1-BS4-BS5.

On this basis, it can be determined that the device is located in one of candidate constellations: BS1-BS2-BS4, BS1-BS3-BS4, and BS1-BS4-BS5.

These conclusions are collected in Table 1 as follows:

TABLE 1

Initial constellation selection for example data

| Triangle Constellation, BS1 | UE possible position outside the triangle | AoA or Beam forming | Initial Constellation selection | Base Station Ranking, BS1 |
|---|---|---|---|---|
| BS1-BS2-BS3 | BS1-BS2-BS3 | | | BS1: 3 |
| BS1-BS2-BS4 | BS1-BS2-BS4 | BS1-BS2-BS4 | BS1-BS2-BS4 | BS2: 1 |
| BS1-BS2-BS5 | BS1-BS2-BS5 | | | BS3: 1 |
| BS1-BS3-BS4 | BS1-BS3-BS4 | BS1-BS3-BS4 | BS1-BS3-BS4 | BS4: 3 |
| BS1-BS3-BS5 | BS1-BS3-BS5 | | | BS5: 1 |
| BS1-BS4-BS5 | BS1-BS4-BS5 | BS1-BS4-BS5 | BS1-BS4-BS5 | |
| BS2-BS3-BS4 | BS2-BS3-BS4 | | | |
| BS2-BS3-BS5 | | | | |
| BS2-BS4-BS5 | BS2-BS4-BS5 | | | |
| BS3-BS4-BS5 | | | | |

In order to generate the prioritized list of neighbouring reference sites OTDOA positioning may be requested, and a serving mobile location centre (SMLC) positioning logic may send a Request (e.g. using LPP protocol) to the given device (UE). The device may switch to RRC Connected state for the serving cell (e.g. BS1 in the system 130). The UE in this case may perform Random Access Procedure such that BS1 may initially estimate UE position based on Timing Advance (TA), which is a range from the antenna, thereby providing the first arc 102 discussed above. Other data, such as azimuth, angle of arrival (AoA) and/or beamforming data may also be used, for example to generate the zone 132 shown in the system 130 within which the UE may be located.

Table 1 illustrates combinations of constellations for an example embodiment. In this way, the best constellation (neighbour cells) can be identified, as can constellations that do not bring any value with respect to GDP optimization.

Thus, as an outcome, an SMLC positioning logic may put GDP-based priority for Neighbour Cell list in OTDOA Assistance Data and the list may be prioritized for instance such as: BS1, BS4, BS2, BS3.

As it may be seen, the proposed prioritized list is short, such that processing time is short, but the list may also include certain redundancy if for any reason the given UE may not be able the first three indicated base stations (e.g. BS1-BS4-BS2, although BS1-BS4-BS3 or BS1-BS4-BS5 would be equally effective).

Further optimization may be possible if the SMLC positioning logic has access to UE historical data such as tracking data, UE measurements, handovers or logging MTD data, even if they are out of date by a short period (e.g. a few minutes). If such data are available, a second set of the given UE Range and Azimuth may be identified, which may further narrow of possible constellation choice, as discussed further below.

Figure 14:
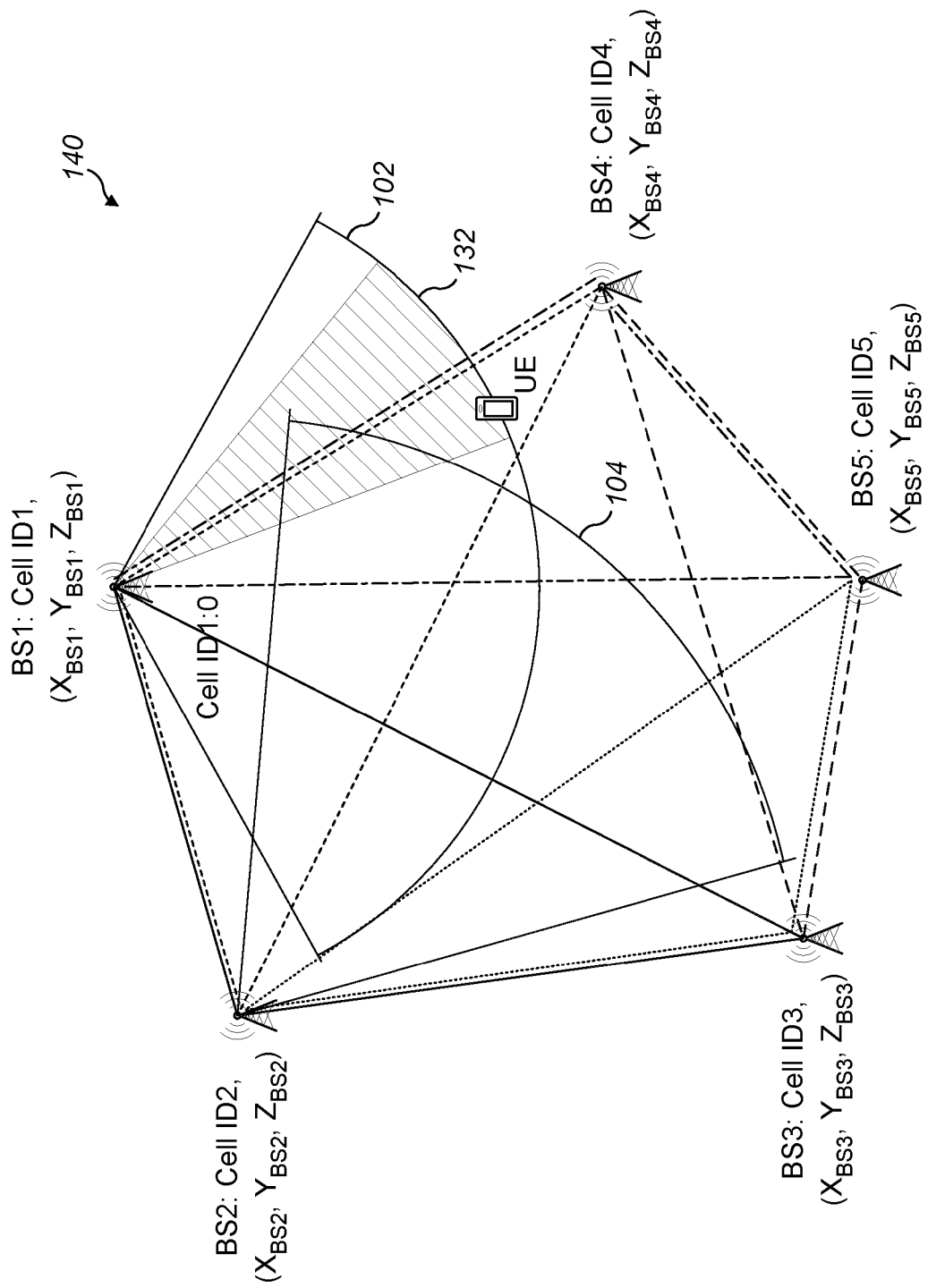

FIG. 14 is a block diagram of a system, indicated generally by the reference numeral 140, in accordance with an example embodiment. The system 140 comprises the first base station (BS1), the second base station (BS2), the third base station (BS3), the fourth base station (BS4) and the fifth base station (BS5) of the systems 100 and 130 described above.

As described above, a first arc 102 of possible positions for the device may be determined based on the first time delay data and the location of the first serving cell. A second arc 104 of possible previous for the device may also be determined.

The arc 104 pass through all of the candidate constellations discussed above, with the exception of BS2-BS3-BS5 and BS3-BS4-BS5.

The zone 132 passes through candidate constellations BS1-BS2-BS3. There is no angle or zone data associated with the second position estimate. These conclusions are collected in Table 2 as follows:

TABLE 2

Initial constellation selection for example data

| Triangle Constellation, BS2 | UE possible position outside the triangle | AoA or Beam forming | Initial Constellation selection | Base Station Ranking, BS2 |
|---|---|---|---|---|
| BS1-BS2-BS3 | | N/A | | BS1: 5 |
| BS1-BS2-BS4 | BS1-BS2-BS4 | N/A | BS1-BS2-BS4 | BS2: 5 |
| BS1-BS2-BS5 | BS1-BS2-BS5 | N/A | BS1-BS2-BS5 | BS3: 5 |
| BS1-BS3-BS4 | BS1-BS3-BS4 | N/A | BS1-BS3-BS4 | BS4: 6 |
| BS1-BS3-BS5 | BS1-BS3-BS5 | N/A | BS1-BS3-BS5 | BS5: 6 |
| BS1-BS4-BS5 | BS1-BS4-BS5 | N/A | BS1-BS4-BS5 | |
| BS2-BS3-BS4 | BS2-BS3-BS4 | N/A | BS2-BS3-BS4 | |
| BS2-BS3-BS5 | BS2-BS3-BS5 | N/A | BS2-BS3-BS5 | |
| BS2-BS4-BS5 | BS2-BS4-BS5 | N/A | BS2-BS4-BS5 | |
| BS3-BS4-BS5 | BS3-BS4-BS5 | N/A | BS3-BS4-BS5 | |

By summing the data in tables 1 and 2, we may conclude the following:

TABLE 3

Combined constellation selection for example data

| Base Station Ranking, BS1 | Base Station Ranking, BS2 | Outcome, BS1 + BS2 |
|---|---|---|
| BS1: 3 | BS1: 5 | BS1: 8 |
| BS2: 1 | BS2: 5 | BS2: 6 |
| BS3: 1 | BS3: 5 | BS3: 6 |
| BS4: 3 | BS4: 6 | BS4: 9 |
| BS5: 1 | BS5: 6 | BS5: 7 |

For the example data above, the optimum constellation may be BS4-BS1-BS5 as these sites contributes to the majority of constellations in which device is within their boundaries. Thus, as an outcome, SMLC positioning logic may put GDP-based priority for Neighbour Cell list in OTDOA Assistance Data, and the list may be prioritized for instance such as: BS4, BS1, BS5, BS2, where BS2 provided for redundancy.

In the algorithm 30 described above, a constellation is selected in the operation 34, based on the first position estimate for the device. There are variety of factors that may be considered when selecting a constellation.

Figure 15:
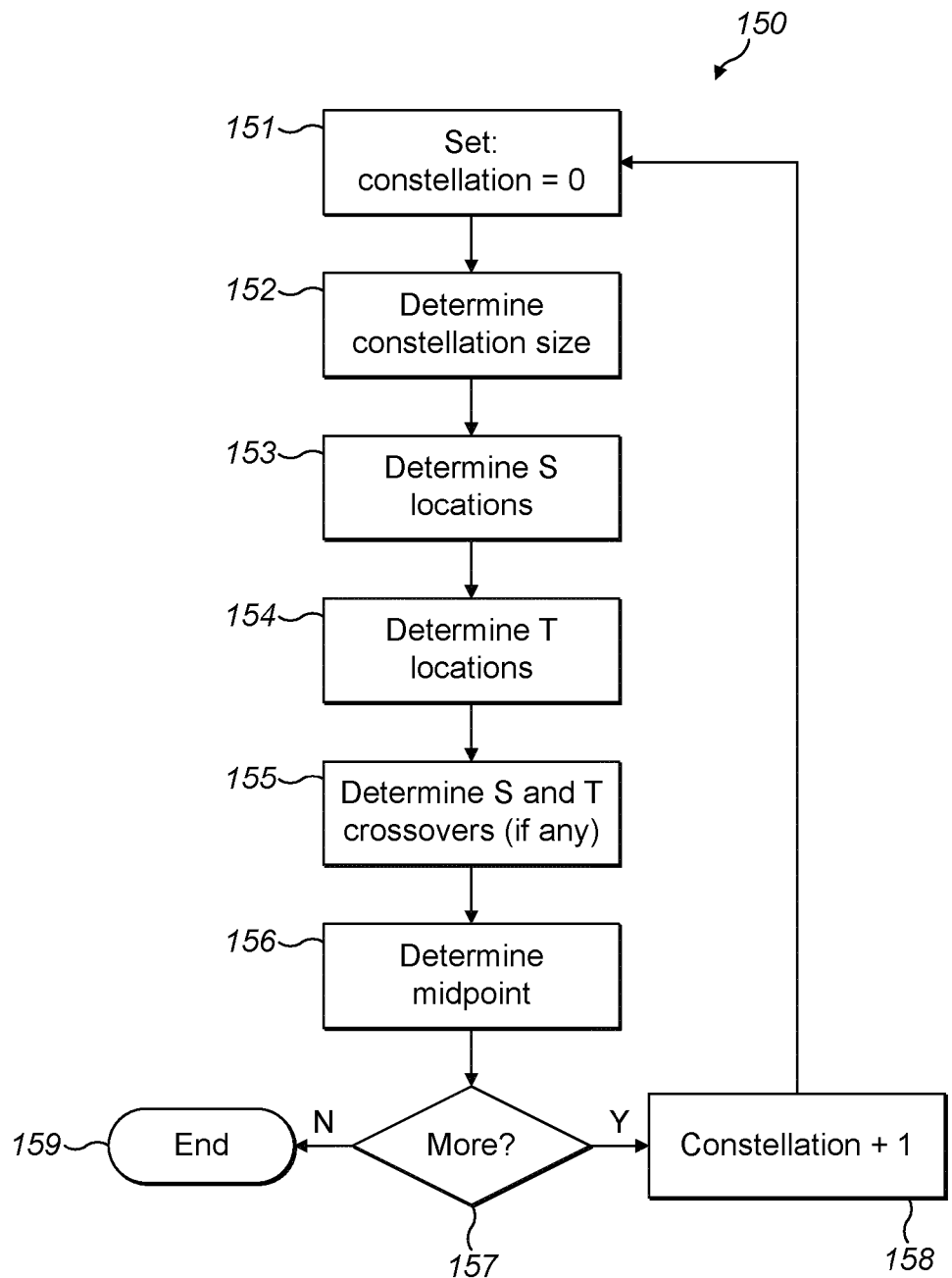
FIG. 15 is a flow chart showing an algorithm in accordance with an example embodiment.

FIG. 15 is a flow chart showing an algorithm, indicated generally by the reference numeral 150, in accordance with an example embodiment.

The algorithm 150 determines data for each of a plurality of candidate constellations. The constellations are numbered 0, 1, 2, 3 etc. A constellation can then be selected in the operation 34 described above on the basis of the collected data.

Consider, for example, the system 130 comprising first to fifth base stations BS1 to BS5. Those base stations are labelled A to E respectively in the algorithm 150 described above. Reference Sites A-E are defined by coordinates (x, y) in the plots discussed further below.

Base Station S represents the base station, which establishes RRC Connection with the UE. In this example, the first base station BS1 is the base station S. Similarly, the base Station T represents a second base station that provides additional (historical) data to SMLC positioning logic. In this example, the second base station BS2 is the base station T.

Base Stations S and T may be characterized by azimuth coverage S_A and T_A respectively, and by timing advance based range S_R and T_R, at which the given device may be detected. As discussed above, the arc 102 and zone 132 define possible locations of the device as determined by the base station BS1 (the base station S in the algorithm 150). Similarly, the arc 104 defines possible locations of the device as determined by the base station BS2 (the base station T in the algorithm 150).

With five base stations, ten candidate constellations are identified, which candidate are analysed for optimum constellation selection.

The algorithm 150 starts at operation 151, where the constellation number is set to zero. Thus, the first iteration of the algorithm 150 is performed based on constellation zero. That first constellation may comprise the first to third base stations BS1 to BS3 (referred to as A, B and C below).

At operation 152, the size of the constellation is determined and stored. As discussed further below, the relative size of constellations is a parameter that may be used to select between candidate constellations.

At operations 153 and 154, a determination is made for the selected range and/or azimuth for base stations S and T, whether the device may be within the given candidate constellation boundaries. This may be based, for example, on the arcs and/or zones of possible device locations 102, 104, 132 discussed in detail above.

Specifically, in operation 153, a determination is made regarding whether the device may be within the selected constellation according the base station S. Similarly, in operation 154, a determination is made regarding whether the device may be within the selected constellation according to the base station T.

At operation 155, any cross-overs between the data determined in operations 153 and 154 are determined. This is indicated by the label S+T below. For example, the operation 155 may identify cross-over points between the arcs 102 and 104 that fall within the relevant candidate constellation.

At operation 156, data relating to the geometric middle of the given candidate constellation is determined. In particular, the distance (e.g. an average distance) between crossovers identified in the operation 155 and the geometric middle of the respective candidate constellation may be determined and stored. The distance between cross-over points and the middle of a constellation is a parameter that may be used to select between candidate constellations.

At operation 157, a determination is made regarding whether any additional candidate constellations exist. If so, the algorithm moves to operation 158, where the constellation number is incremented and the operations 151 to 156 are repeated for the next candidate constellation. Once all candidate constellations have been processed, the algorithm 150 terminates at operation 159.

Figure 16:
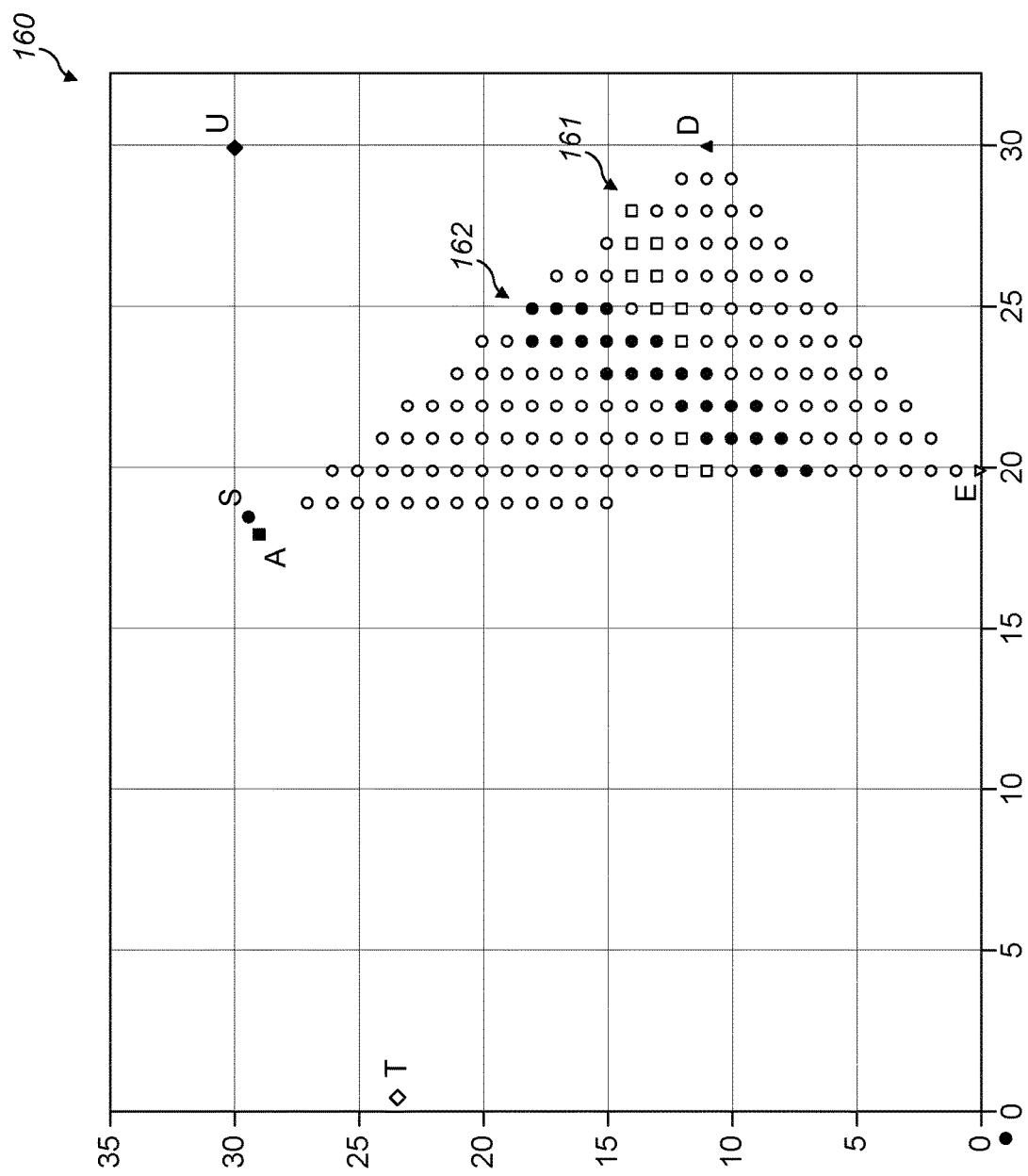
FIGS. 16 to 18 are plots of data in accordance with example embodiments.

FIG. 16 is a plot, indicated generally by the reference numeral 160, in accordance with an example embodiment. The plot 160 shows data collected by the algorithm 150 for a candidate constellation comprising base stations A, D and E (e.g. the base stations BS1, BS4 and BS5 described above). (As noted below, the system comprises base stations A, B, C, D and E—base stations B and C are not shown in the plot 160.)

In the plot 160, each circle represents a potential UE coordinate within the given candidate constellation. A first set of circles 161 represent potential UE locations meeting range and/or azimuth criteria for base station S. A second set of circles 162 represents potential UE locations for the base station T.

Figure 17:
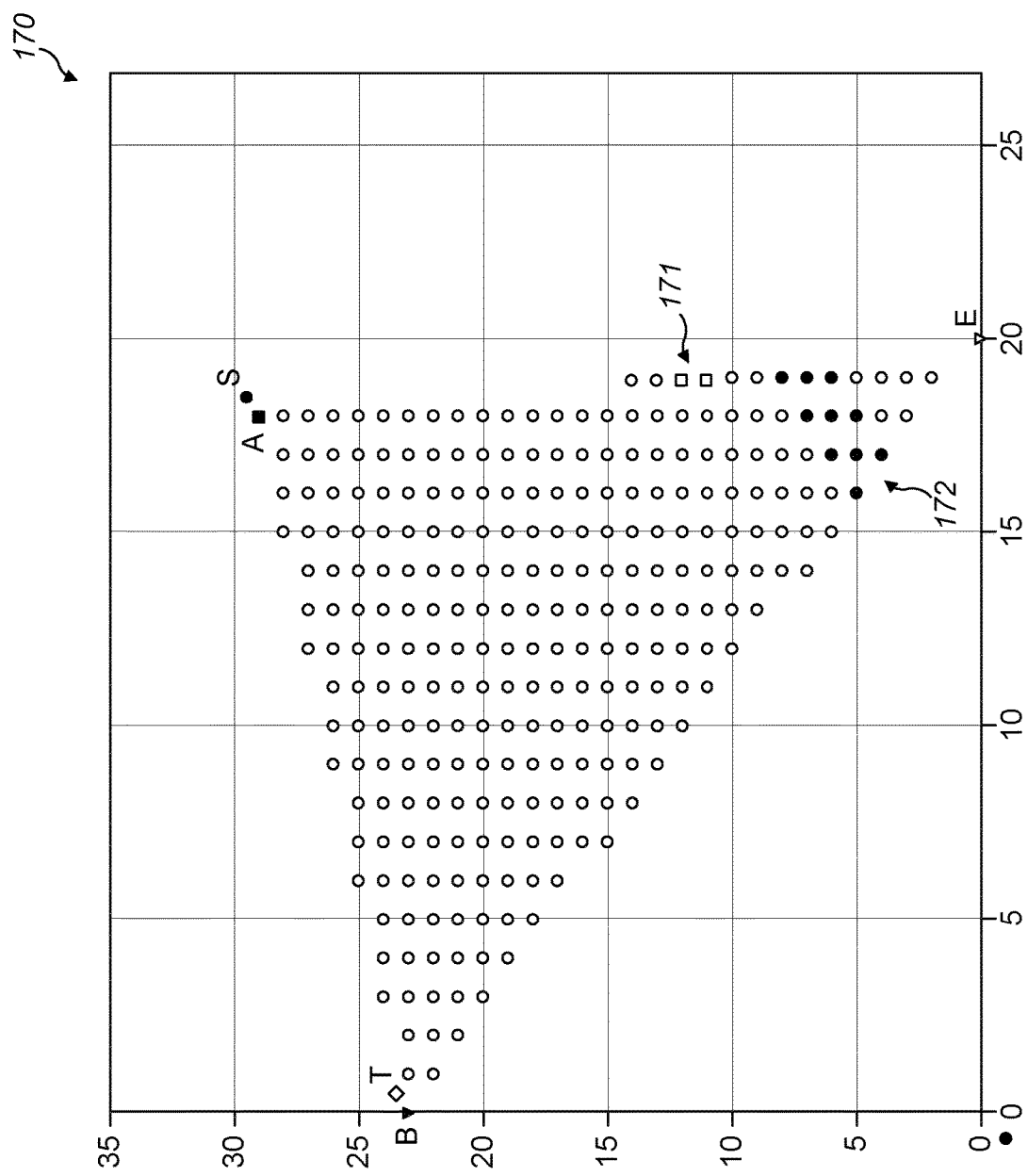

Similarly, FIG. 17 is a plot, indicated generally by the reference numeral 170, in accordance with an example embodiment that shows data collected by the algorithm 150 for a candidate constellation comprising base stations A, B and E (e.g. the base stations BS1, BS2 and BS5 described above). (The base stations C and D are not shown in the plot 170.)

In the plot 170, each circle represents a potential UE coordinate within the given candidate constellation. A first set of circles 171 represent potential UE locations meeting range and/or azimuth criteria for base station S. A second set of circles 172 represents potential UE locations for the base station T.

Thus, the plots 160 and 170 show data collected in two instances of the operations 153 and 154 (one for candidate constellations ADE, the other for candidate constellation ABE).

Figure 18:
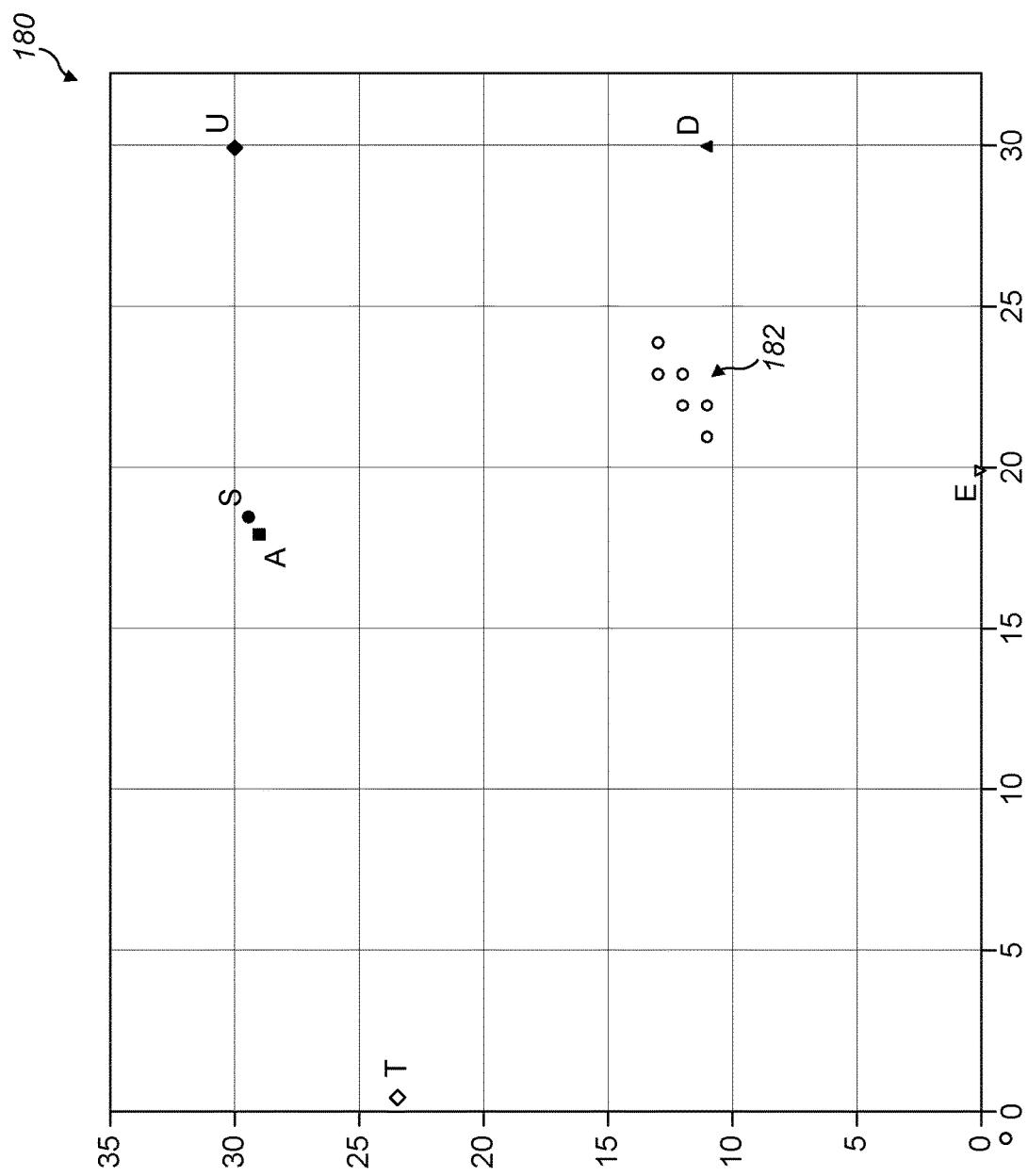

FIG. 18 is a plot, indicated generally by the reference numeral 180, in accordance with an example embodiment. The plot 180 shows locations for cross-overs, indicated generally by the reference numeral 182, identified in the operation 155 for the candidate constellation ADE (i.e. the constellation shown in the plot 160).

Similar plots to the plot 180 can be generated for each of the candidate constellation and used for generating data for those candidate constellations for use in selecting the optimum constellation.

Table 4 below shows example data for each of the candidate constellations.

TABLE 4

| | Candidate constellation data | | | | |
|---|---|---|---|---|---|
| | S | T | S + T | Middle | Size |
| ABC | 0 | 0 | 0 | N/A | 186 |
| ABD | 6 | 11 | 0 | N/A | 198 |
| ABE | 2 | 10 | 0 | N/A | 267 |
| ACD | 19 | 24 | 6 | 4.955379 | 267 |
| ACE | 2 | 19 | 0 | N/A | 213.5 |
| ADE | 17 | 26 | 6 | 0.470933 | 156 |
| BCD | 14 | 13 | 6 | 9.480706 | 255 |
| BCE | 0 | 9 | 0 | N/A | 132.5 |

TABLE 4-continued

| | Candidate constellation data | | | | |
|---|---|---|---|---|---|
| | S | T | S + T | Middle | Size |
| BDE | 14 | 25 | 6 | 4.345777 | 225 |
| CDE | 0 | 21 | 0 | N/A | 102.2 |

As described above, the operation 34 may select the optimum constellation, which corresponds to neighbour cells, which may be used for optimization of GDP due to optimum constellation geometry.

For example data, the final decision based on three criteria expressed by columns: "S+T", "Middle" and "Size".

The data S indicates the number of points (the circles in the plots 160 and 170) within the candidate constellation where the device could be located according to data from the serving cell. The data T indicates the number of points within the candidate constellation where the device could be located according to data from the historic data. The data S+T indicates overlaps between the points in the data S and T (e.g. the circles in the plots 180).

The intersection area indicated by the data S+T is based on the timing advance and azimuth data.

The parameter "Middle" is a measure of a distance from possible UE position with respect to geometric middle of the given candidate constellation triangle. If the position is closer to the centre, the better GDP may be expected.

The parameter "Size" refers to area of the given candidate constellation triangle. It may be assumed that if the given field is small, the given constellation may not be optimum due to possible fast changes in GDP or not favour constellation geometry, e.g. if three sites are in one line.

The algorithms described herein may be especially effective before SMLC send OTDOA positioning request with a list of neighbour cells as it may enable GDP-based site prioritization. Once SMLC positioning logic receive OTDOA/multilateration measurements, it may determine exact UE position using multilateration equations. At this step, further improvement may be applied.

Figure 19A:
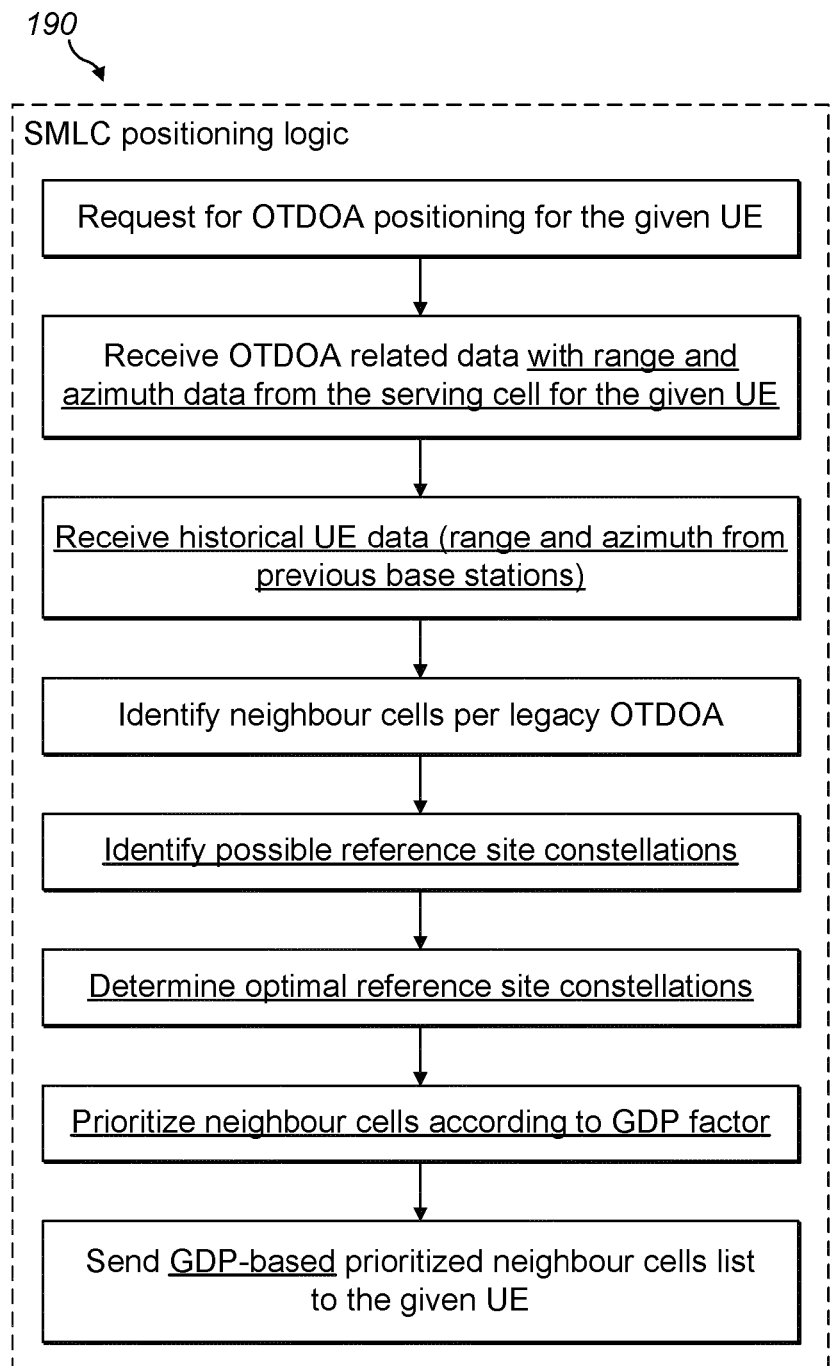
FIGS. 19A to 19C are flow charts showing algorithms in accordance with example embodiments.
Figure 19B:
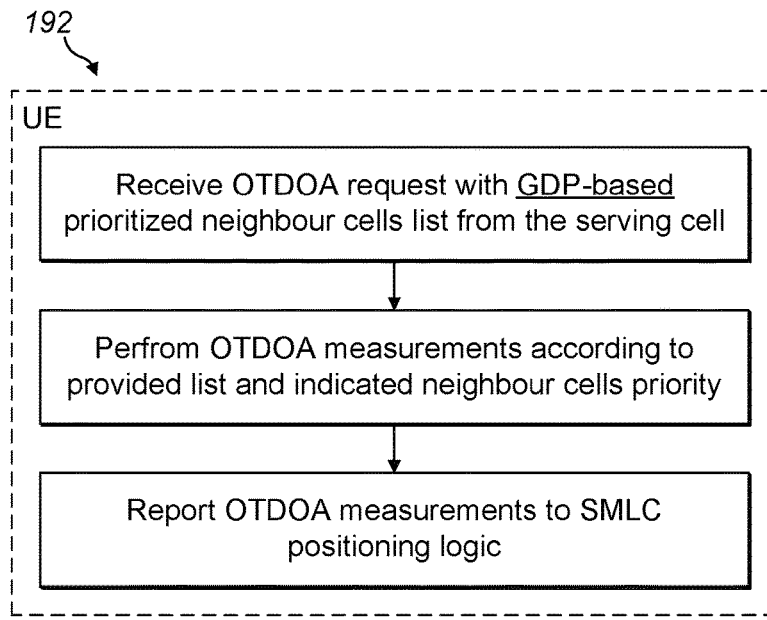
Figure 19C:
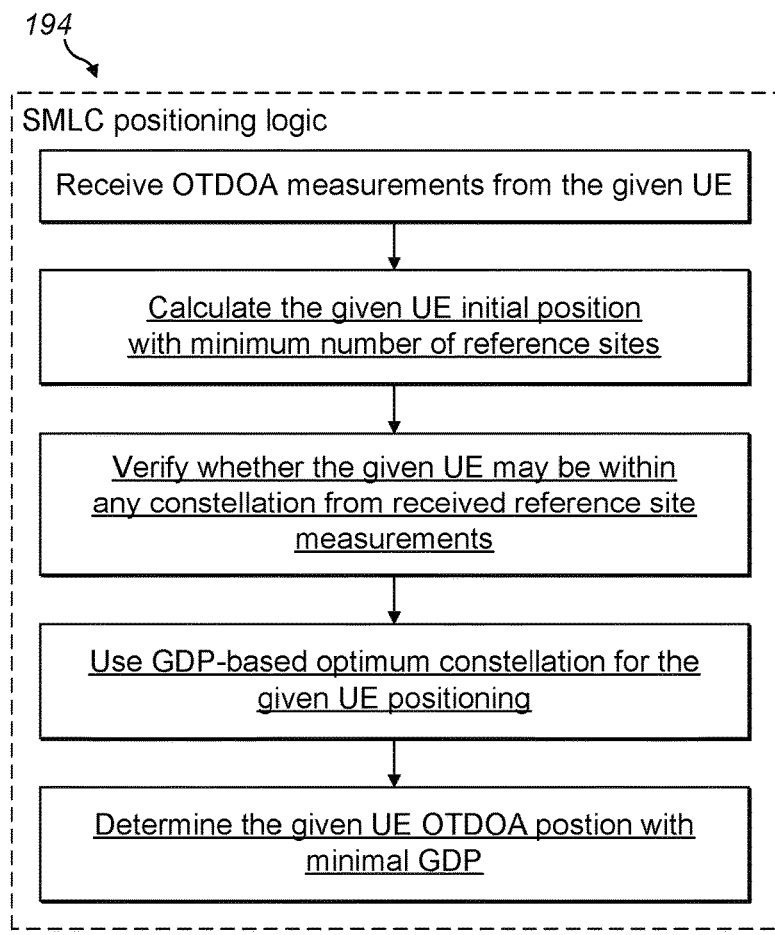

FIGS. 19A to 19C are flow chart showing algorithms, indicated generally by the reference numerals 190, 192 and 194 respectively, in accordance with example embodiments. Specifically, the algorithms 190 and 194 shows steps carried out at an example SMLC and the algorithm 192 shows steps carried out at an example device. The algorithms 190, 192 and 194 may form a single algorithm.

In the algorithm 190, the SMLC positioning logic request OTDOA positioning for the given UE. In this context, SMLC positioning logic may additionally receive range and azimuth data from the serving cell for the given UE and historical data, if available, which may be used for further narrowing of possible candidate constellations.

Based on available data, SMLC positioning logic may prioritize neighbour cells according to GDP impact, which identifies the most crucial reference sites (e.g. base stations). Thus, the OTDOA measurements from these sites may give optimum or minimal GDP.

In the algorithm 192, the given UE may perform OTDOA measurements according to GDP-based neighbour cells priority and then UE may report OTDOA measurements to SMLC positioning logic. The provided neighbour cells list may be shorter than in the prior art.

In the algorithm 194, the SMLC positioning logic may gather OTDOA measurements from the given UE. Based on the OTDOA measurements, an initial UE position may be determined with a help of minimum data set, e.g. single intersection of hyperboloids may be sufficient. Then, SMLC positioning logic may verify whether initial UE position is within any constellation constructed from Reference Sites indicated in the list of OTDOA measurements. If so, an optimum Constellation may be selected as indicated in the proposed method or an optimum constellation may be identified considering the given set of OTDOA measurements data set.

If SMLC positioning logic, based on UE initial data (e.g. range and azimuth), in the algorithm 190, or by initial positioning OTDOA measurements, in the algorithm 194, determines that the given UE is located outside each possible Reference Site Constellation, still number of required Reference Site and associated OTDOA measurements may be limited as additional data does not significantly improve UE position accuracy as due to bad geometry its size may not be efficiently optimized.

As described above, a first position estimate for a device (such as a user device) may be determined based, at least in part, on time delay data from a first serving cell to the device and second data relating to at least one second cell. The second data may be time delay data, but many alternatives are possible, such as the use of signal strength data as discussed further below.

Figure 20:
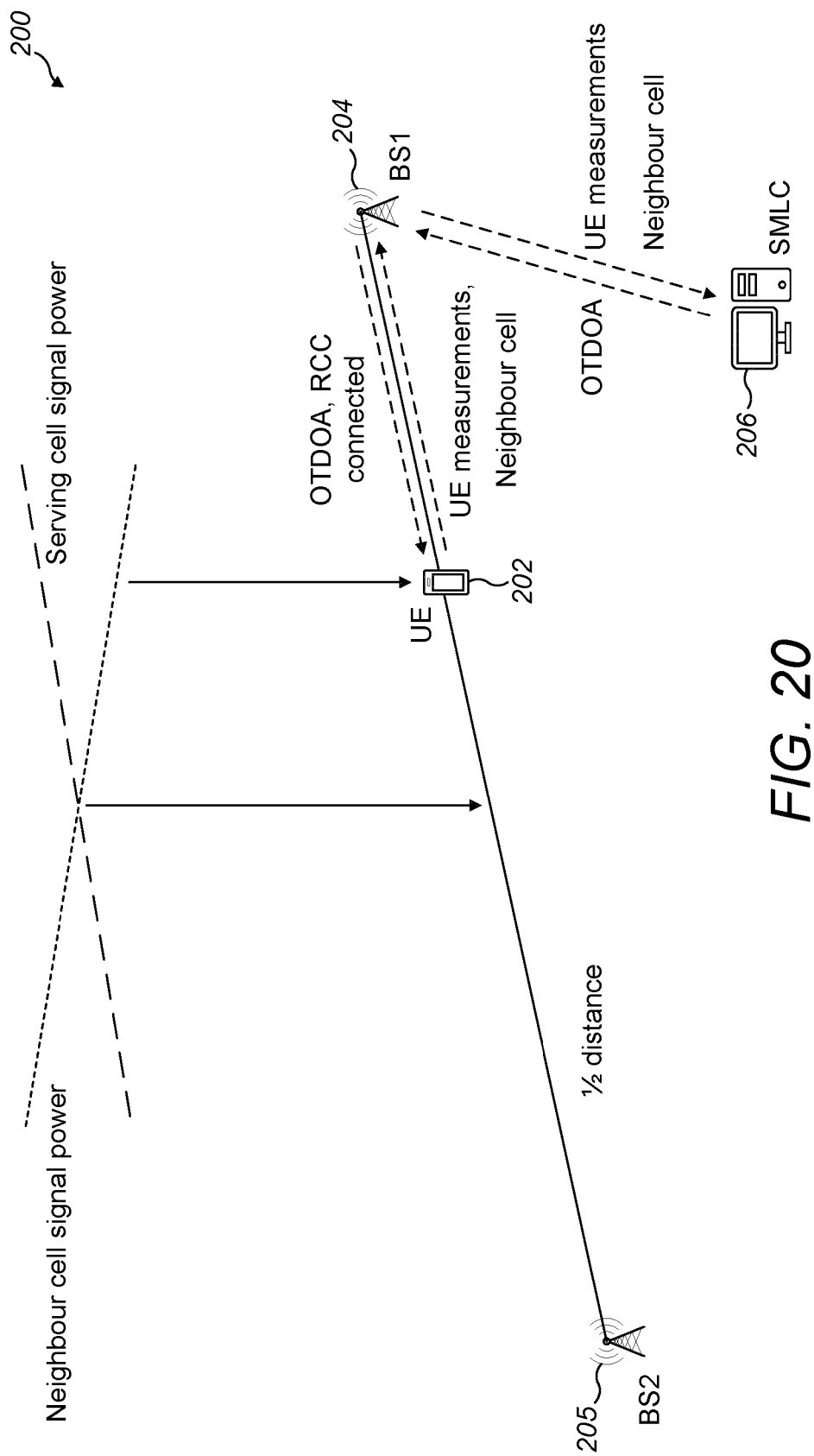
FIGS. 20 and 21 are block diagrams of systems in accordance with example embodiments.

FIG. 20 is a block diagram of a system, indicated generally by the reference numeral 200, in accordance with an example embodiment. The system 200 comprises a device, or a user device, 202 that is located between a first base station 204 and a second base station 205, and an SMLC unit 206.

The user device 202 may perform periodic cell signal measurements (e.g. signal strength measurements) for cell selection and handovers procedures. These signal measurements may be stored by user device and may be reported to the relevant network as events. Network operators use these data for network optimisation (e.g. tracking data).

As illustrated on FIG. 20, the user device 202 detects signals from the first base station 204 (which may be the serving cell) and the second base station 205 (which may be a neighbour cell). Since measured power level is a function of an approximate distance from the given cell, these data can be used in positioning.

Once OTDOA positioning is requested by the SMLC unit 206, the user device 202 may be requested to report measured neighbour cell signal strength (e.g. from the strongest or for a few neighbour cells). Reported values may be relative values (with respect to the serving cell) or absolute values.

Figure 21:
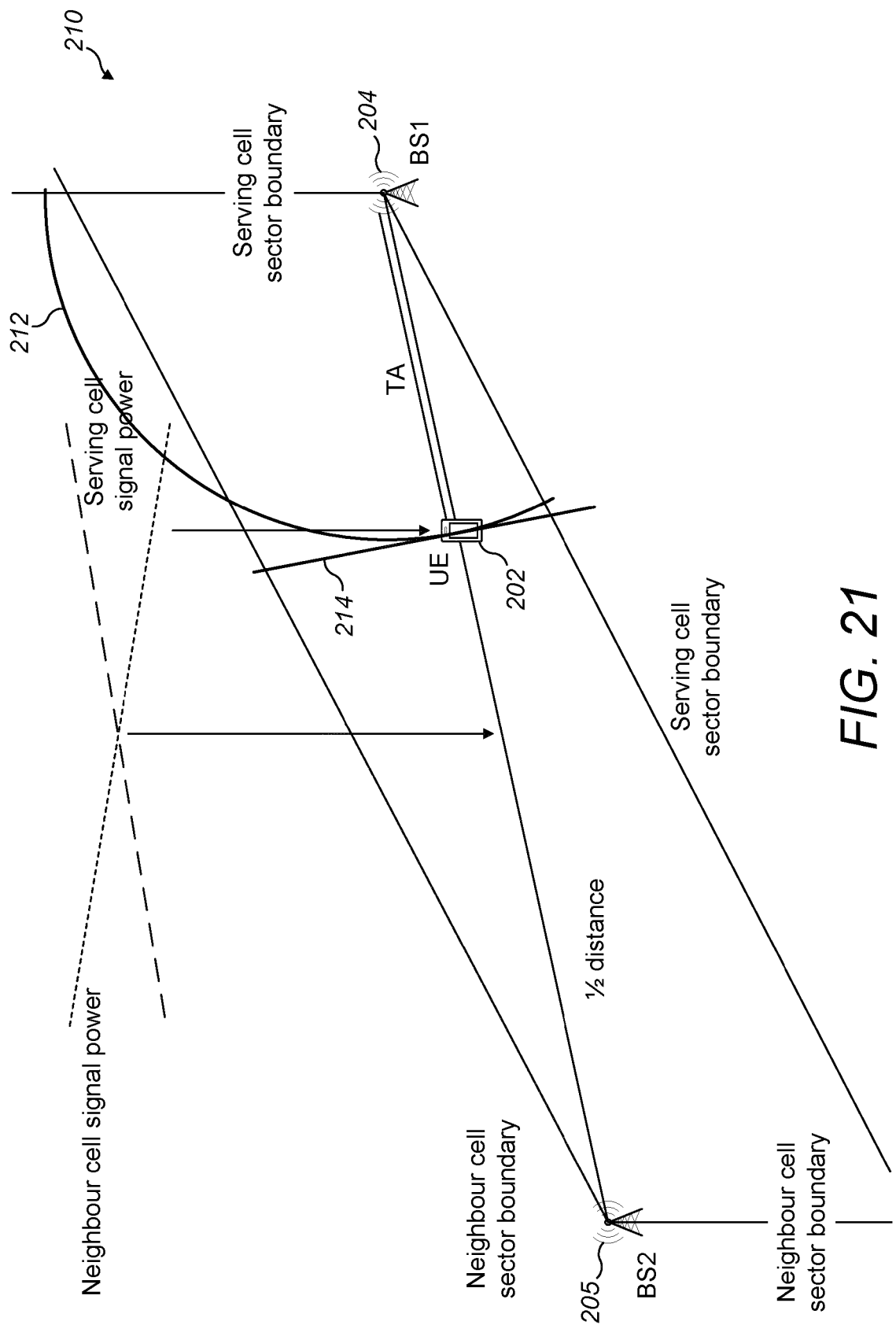

FIG. 21 is a block diagram of a system, indicated generally by the reference numeral 210, in accordance with an example embodiment. The system 210 comprises the user device 202, the first base station 204 and the second base station 205 described above.

Thus system 210 shows an arc 212 indicating a distance related to a time delay from the first base station 204 to the user device 202 and a line 214 indicating possible positions of the user device based on the relative signal strengths from the first and second base stations, as discussed above. The intersection between the arc 212 and the line 214 may be used as an initial estimate for the position of the user device 202.

Using additional information such as data relating to cell sectors, a previous position of the user device, and measurements from other neighbour base stations or from different access nodes a better initial position estimate for the user device 202 may be obtained.

A number of example embodiments have been described that seek to improve UE positioning accuracy by selection of optimum reference site (or base station) constellations, for example having minimal Geometric Dilution of Precision (GDP) related error. Thus, calculated UE position may have minimum error related to constellation geometry.

At least some example embodiments use GDP-based neighbour cells prioritization, which indicate, in descending order, which neighbour cells should be used for OTDOA related measurements. The list may be relatively short as some neighbour cells may be excluded from OTDOA measurements, as they may not improve UE position accuracy. Certain redundancy may be maintained to give some freedom to UEs.

Benefit of some example embodiments include a reduction in radio resources required for signalling purposes and fewer multilateration measurements. This may result in faster processing.

Figure 22:
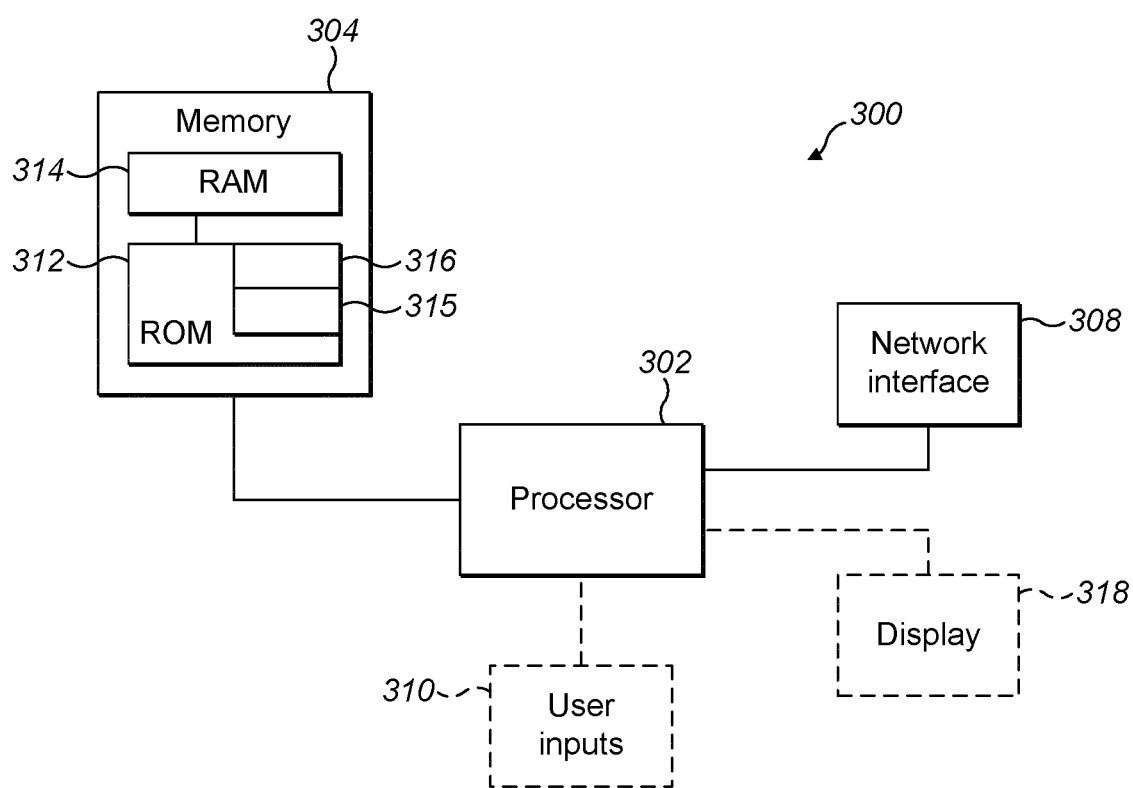
FIG. 22 is a block diagram of components of a system in accordance with an example embodiment.

For completeness, FIG. 22 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 20, 30, 80, 90, 110, 150, 190, 192 and 194 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 23A:
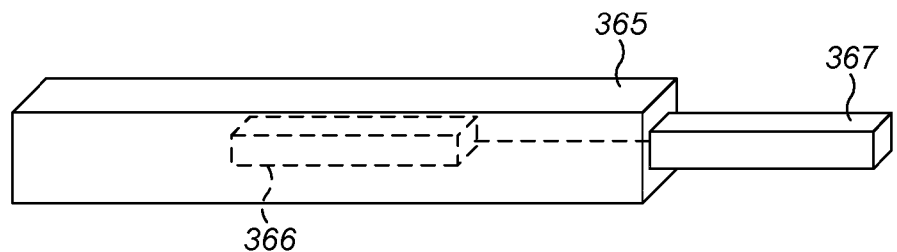
FIGS. 23A and 23B show tangible media, respectively a removable non-volatile memory unit and a compact disc (CD) storing computer-readable code which when run by a computer perform operations according to example embodiment.
Figure 23B:
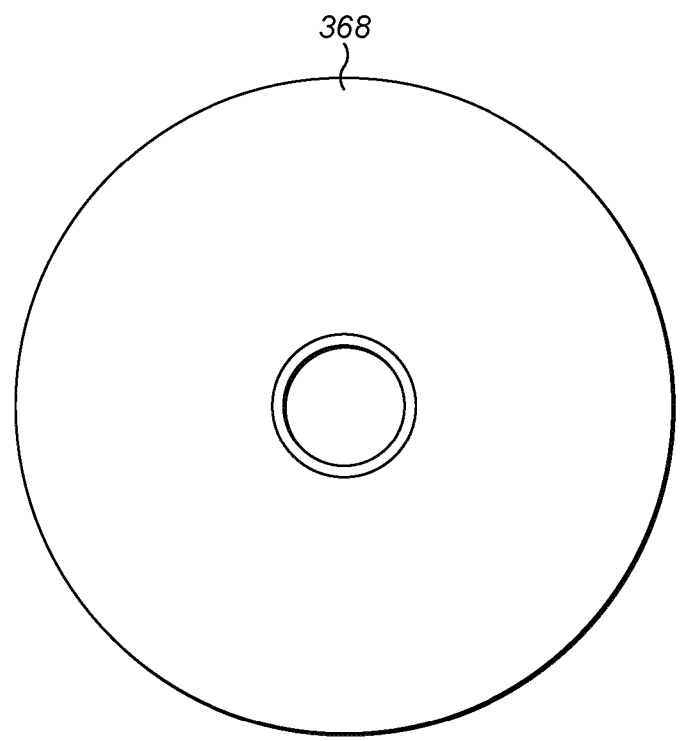

FIGS. 23A and 23B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2, 3, 8, 9, 11, 15, and 19A to 19C are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor and at least one memory including computer program code; the at least one memory and the computer program code configured to, with the at least one processor, cause the apparatus at least to:
   determine a first position estimate for a device based, at least in part, on time delay data from a first serving cell to the device and second data relating to at least one second cell;
   select, based on the first position estimate for the device, a first constellation of base stations, from a plurality of candidate constellations of base stations, for use in determining a second position estimate for the device; and
   generate neighbour cell information, wherein said neighbour cell information comprises an ordered list of base stations including at least said first constellation of base stations.

2. An apparatus as claimed in claim 1, wherein the first constellation of base stations is selected such that said first position estimate is within an area defined by the first constellation.

3. An apparatus as claimed in claim 1, further configured to:
   determine a distance of the first position estimate from a centre of each of at least some of said candidate constellations, wherein said first constellation of base stations is selected based, at least in part, on said determined distances.

4. An apparatus as claimed in claim 1, wherein the second data includes time delay data from the at least one second cell and the device and/or signal strength data relating to the at least one second cell and the device.

5. An apparatus as claimed in claim 1, wherein performing selecting the first constellation of base stations selects said constellation based, at least in part, on relative sizes of said candidate constellations.

6. An apparatus as claimed in claim 1, wherein performing selecting the first constellation of base stations selects said constellation based, at least in part, on minimising a measure of geometric dilution of precision with minimal required number of measurements.

7. An apparatus as claimed in claim 1, wherein the first serving cell is a current serving cell for the device and at least one of the at least one second cell is a previous cell for the device.

8. An apparatus as claimed in claim 1, wherein the first position estimate for a device is based, at least in part, on angle of arrival data and/or beamforming data for one or more transmissions from the first serving cell to the device and/or one or more transmissions from at least one of the second serving cells to the device.

9. An apparatus as claimed in claim 1, further configured to:
   determine a first arc of possible positions for the device based on the first time delay data and the location of the first serving cell; and determine one or more second arcs of possible positions for the device based on the second data and the location of the respective second cell, wherein determining the first position estimate comprises determining an intersection between the first and second arcs.

10. An apparatus as claimed in claim 1, wherein the selected constellation of base stations comprises three or more base stations.

11. An apparatus as claimed in claim 1, further configured to: determine said second position estimate using said constellation of base stations.

12. An apparatus as claimed in claim 1, wherein said ordered list of base stations is ordered in decreasing of geometric dilution of precision.

13. A method comprising:
determining a first position estimate for a device based, at least in part, on time delay data from a first serving cell to the device and second data relating to at least one second cell;
selecting, based on the first position estimate for the device, a first constellation of base stations, from a plurality of candidate constellations of base stations, for use in determining a second position estimate for the device; and
generating neighbour cell information, wherein said neighbour cell information comprises an ordered list of base stations including at least said first constellation of base stations.

14. A method as claimed in claim 12, further comprising determining said second position estimate using said first constellation of base stations.

15. A non-transitory computer readable medium comprising program instructions stored thereon for performing at least the following:
determining a first position estimate for a device based, at least in part, on time delay data from a first serving cell to the device and second data relating to at least one second cell; and
selecting, based on the first position estimate for the device, a first constellation of base stations, from a plurality of candidate constellations of base stations, for use in determining a second position estimate for the device; and
generate neighbour cell information, wherein said neighbour cell information comprises an ordered list of base stations including at least said first constellation of base stations.

* * * * *